US 11,791,876 B2

(12) United States Patent
Rainish

(10) Patent No.: US 11,791,876 B2
(45) Date of Patent: Oct. 17, 2023

(54) PHASED ARRAY SYSTEM AND METHOD

(71) Applicant: SATIXFY UK LIMITED, Farnborough (GB)

(72) Inventor: Doron Rainish, Ramat Gan (IL)

(73) Assignee: SATIXFY UK LIMITED, Farnborough (GB)

(*) Notice: Subject to any disclaimer, the term of this patent is extended or adjusted under 35 U.S.C. 154(b) by 0 days.

(21) Appl. No.: 17/624,405

(22) PCT Filed: Jun. 22, 2020

(86) PCT No.: PCT/IL2020/050693
§ 371 (c)(1),
(2) Date: Jan. 3, 2022

(87) PCT Pub. No.: WO2020/261261
PCT Pub. Date: Dec. 30, 2020

(65) Prior Publication Data
US 2022/0360303 A1 Nov. 10, 2022

(30) Foreign Application Priority Data
Jun. 27, 2019 (IL) .......................... 267705

(51) Int. Cl.
H04B 7/06 (2006.01)
H01Q 3/38 (2006.01)

(52) U.S. Cl.
CPC .............. *H04B 7/0617* (2013.01); *H01Q 3/38* (2013.01)

(58) Field of Classification Search
CPC ...... H04B 7/0617; H04B 7/0848; H01Q 3/38; H01Q 25/00; H01Q 3/26; H04L 49/109
(Continued)

(56) References Cited

U.S. PATENT DOCUMENTS
6,201,508 B1 3/2001 Metzen et al.
6,340,948 B1 1/2002 Munoz-Garcia et al.
(Continued)

FOREIGN PATENT DOCUMENTS
IL 267203 B 11/2020
WO 2017/153985 A1 9/2017
WO 2019/142197 A1 7/2019

OTHER PUBLICATIONS

Poon Ada SY and Mazhareddin Taghivand, "Supporting and enabling circuits for antenna arrays in wireless communications", Proceedings of the IEEE 100, No. 7 (2012): 2207-2218. Mazhareddin Taghivand Mar. 16, 2012.
(Continued)

Primary Examiner — Fitwi Y Hailegiorgis
(74) Attorney, Agent, or Firm — BROWDY AND NEIMARK, P.L.L.C.

(57) ABSTRACT

A beamforming circuit for receiving and/or transmitting one or more (typically a plurality of) beams. The beamforming circuit includes: an antenna I/O module having antenna ports; a data bus connection for connecting to a data bus for communication of data streams of one or more beams to be produced (received or transmitted); a beamforming module including a plurality of beam-forming channels connectable in between the data bus connection and the antenna ports for processing signals communicated between them to introduce controllable shifts (e.g. time-delays and/or phase-shifts) in order to beamform the processed signals, being received and/or transmitted. Whereby the beamforming circuit includes a cascade I/O module enabling to connect one or more additional beam-forming circuits to the beamforming circuit, in a "vertical" cascade, to thereby enable forming of one or more additional beams by the beamforming modules of the one or more additional beamforming circuits. The cascade I/O module includes a plurality of cascade ports respectively connected to the plurality of antenna ports via a plurality of corresponding bypass channels. Each antenna port is connectable, in parallel, to at least one respective bypass channel and to one or more of the beamforming
(Continued)

channels of the beamforming circuit, via a signal splitter/combiner. In transmission configuration/mode, the signal splitter/combiner is operable for combining signals from the bypass channel and the one or more beamforming channels, which are associated with the respective antenna port; and in reception configuration/mode, the signal splitter/combiner is configured and operable for splitting the signals of the respective antenna port to form duplicates thereof at the respective bypass channel and the one or more beamforming channels associated with the respective antenna port.

20 Claims, 7 Drawing Sheets

(58) Field of Classification Search
USPC .......................................................... 375/267
See application file for complete search history.

(56) References Cited

U.S. PATENT DOCUMENTS

| | | | |
|---|---|---|---|
| 10,720,985 B1* | 7/2020 | Kanar | H04W 16/28 |
| 2003/0011516 A1 | 1/2003 | Moch | |
| 2013/0314280 A1 | 11/2013 | Maltsev et al. | |
| 2018/0248598 A1* | 8/2018 | Gam | H01Q 3/40 |
| 2018/0287694 A1 | 10/2018 | Buehler et al. | |
| 2019/0089434 A1 | 3/2019 | Rainish et al. | |

OTHER PUBLICATIONS

Zarb-Adami Kristian, et al., "Beamforming techniques for large-N aperture arrays", In 2010 IEEE International Symposium on Phased Array Systems and Technology, pp. 883-890. IEEE, 2010. Zarb-Adami Kristian Oct. 12, 2010.

* cited by examiner

PHASED ARRAY SYSTEM AND METHOD

TECHNOLOGICAL FIELD

This invention is in the field of phased array antennas and more specifically relates to phase array antennas systems and digital circuits thereof for use in multibeam communication.

BACKGROUND

Phased array antennas (PAAs) offer many advantages including electronic beam steering and scanning, optimized beam pattern with reduced sidelobes, and reduced power consumption and weight. True-time-delay (TTD) steering techniques are typically required for controlling operation of multiple antenna elements in the array, while keeping the broad bandwidth of the antenna radiation and allowing large scan angle and/or large antenna size, so that efficient elemental vector summation (in the receive mode) or distribution (in the transmit mode) can be obtained that is independent of frequency or angle.

Analogue implementation of a phased array antenna, e.g. which is based on analog (RF) phase shifting, suffers from several drawbacks, including among others: difficulties to implement TTD with analog means, making TTD solutions too cumbersome, large, costly and/or energy consuming and therefore not practical for most cases; inaccurate phase shifting capabilities by analog means (e.g. analog phase shifters may be inaccurate due to production variations) resulting in less accurate beamforming than can be achieved with digital means; implementation of multi beam solutions (whereby the same elements of an antenna array are used to transmit/receive multiple beams (from multiple directions) concurrently is not efficient with analog means (e.g. due to RF losses associated with the addition/splitting of the RF signals with analog means). Implementation of large antennas is difficult and costly, due to the need of accurately calibrated RF transmission lines with prescribed lengths for routing of the signals to the antenna elements of the phased array.

Indeed, digital implementation of PAAs overcome the above drawbacks by applying most of the beam forming processing of the signals by digital means (a digital chip) that is located adjacent to the respective antenna elements. Accordingly, there may be no need, or a reduced need, for splitting/combining RF signals from the antennas, as such splitting/combining may be performed digitally without affecting RF losses. Also, most RF routing requirements (e.g. the lengths of the required RF transmission lines may be saved by placing the digital beamforming chip(s), or the RF front-ends associated therewith, near the antenna elements, whose signals are processed by the digital beamforming chip(s); and also TTD may be implemented efficiently by digital processing.

One major advantage of digital implementation of phase array systems is that such implementation offers a highly scalable architecture that enables beam forming implementation over broad bandwidth and very large antenna sizes, while also enabling readily efficient beamforming of multiple beams concurrently (multibeams).

For example, PCT Patent Application Publication No. WO 2017/153985, which is assigned to the assignee of the present Application, discloses a novel digital baseband beam forming system that may be implemented in a chip (e.g. a silicon chip) and which may be configured and operable for constructing a scalable array comprising a plurality of such beamforming chips connectable to a respective group of antenna elements of an antenna array for carrying out at least one of transmitting and receiving beam formed waveform signals by the respective group of antenna elements. In some implementations, the digital baseband beam forming system includes a plurality of digital baseband beam forming channels configured and operable for connecting, via channel ports, to a plurality of antenna channels associated with respective antenna elements for at least one of transmitting and receiving, through the plurality of antenna elements, one or more waveform signals encoding data streams. The digital baseband beam forming channels are configured and operable to apply at least one of phase shifts and time delays of selective magnitudes, to baseband signals associated with data streams encoding the waveform signals transmitted and/or received by the plurality of antenna elements, thereby beamforming said waveform signals to produce, by said waveforms, one or more data encoded beams associated with respective directions of propagation, and encoding said data streams respectively.

GENERAL DESCRIPTION

There is a need in the art for a novel scalable digital beam forming systems capable of transmitting and receiving multiple beams concurrently.

Known in the art digital beam forming systems are limited in the number of beams that can be efficiently produced concurrently. The bottle neck in this regard is mostly presented by the limited capacity of the digital beamforming chip(s) (which are connected to their respective subsets of antenna elements of the PAA) to handle multiple beams.

For instance, FIG. 1A presents a conventional architecture of digital PAAs in which one or more beamforming chips, BFC1 to BFCm, are connected to antenna elements of an antenna system ANT (e.g. via an RF front end FRE). Each beamforming chips is connected between the data bus BUS and a set of antenna elements, e.g. AE1 to AEn (e.g. as shown antenna element sets SET-1 to SET-m are associated with BFC1 to BFCm), and can handle a limited number of beams, e.g. up to L beams. To this end, such a conventional system is limited for handling up to L beams, according to the number of beams its BF chips can handle. A conventional architecture of digital PAAs for mitigating this limitation is shown in FIG. 1B. Here each set of antenna elements is connected in parallel to two beamforming chips, whereby each of the chips connected in parallel to the same antenna element provides additional capacity for handling beams. For instance the chips BFC11 and BFC12 are both connected in parallel to the set SET-1 of antenna elements, such that BFC11 handles the processing of signals of L beams via these antenna elements, and BFC12 handles the processing of signals of additional L beams via these antenna elements. In a similar way, two chips {BFCHIP21 and BFC22} to {BFCm1 and BFCm2} may be respectively connected in parallel to the antenna elements of sets SET-2 to SET-m.

Thus, one major drawback of the conventional configuration shown in FIG. 1A, is that such a system is limited in the number of beams it can handle. As for the configuration of FIG. 1B, major drawbacks of such a configuration are associated with the limited scalability of such an architecture (limited by the physical construction of the antenna elements and/or front-end modules, and the number of parallel feeding points they have for connecting several chips, and also with substantial signal losses and introduction of noise associated with the splitting or combination of the signals of the parallel connected beamforming chips.

The present invention provides a novel beam forming system and a novel beamforming chip alleviating the above described deficiencies of the conventional system and allowing scalability of digital beam forming systems in terms of both the number of antenna elements and the number of beams which can be concurrently handled/processed, without imposing any configurational restrictions (such as a number of feeding points) on the antenna elements or front end modules connected therewith, and without suffering from RF losses due to a need of combining or splitting of RF signals between different beamforming chips associated with the same antenna elements.

The present invention provides significant advantages when configured for the transmission or reception of multiple data encoded beams. Indeed, the capacity of conventional beamforming circuits to process multiple data encoded beams is often limited due to the high data rates that should be processed and communicated to or from such beamforming circuits, and the ability to connect such circuits, particularly when implemented as integrated circuits (chips) to data buses of sufficient bandwidths/data-rates. As will be appreciated from the below description, the present invention provides a novel technique for overcoming these limitations in conventional techniques for communication of multiple data beams allowing to connect the antenna.

According to a broad aspect of the present invention there is provided a beam forming circuit (e.g. integrated-circuit/chip), including:
  an antenna I/O module including antenna ports for connecting directly or indirectly to a plurality of antenna elements of an antenna system;
  a data bus connection for connecting to a data-bus for communication of one or more beams' signals indicative of data streams of one or more beams to be produced by the beamforming circuit;
  a beam forming module comprising a plurality of beam forming channels connectable in between said data bus connection and antenna ports of said antenna I/O module and adapted to process signals communicated between the data bus and the antenna ports for introducing controllable shifts being at least one of time delay and phase shift to the processed signals so as to beamform said processed signals received or transmitted by respective antenna elements to form at least one beam.

According to the invention the beam forming circuit includes a cascade I/O module including a plurality of cascade ports connected to said plurality of antenna ports respectively via a plurality of corresponding bypass channels, such that each antenna port is connectable, in parallel, to at least one respective bypass channel and to one or more of the beamforming channels via a signal splitter/combiner. The cascade I/O module thereby enables to connect to the beam forming circuit, one or more additional beam forming circuits, in a "vertical" cascade, for forming, by the beam forming modules of the one or more additional beam forming circuits, one or more additional beams, in addition to the at least one beam. In this connection it should be noted that the phrases vertical connection and/or vertical connected and/or vertical cascade, and the like, are used herein interchangeably to designate the connection between beamforming circuits which are associated with and operation of the common antenna elements of an antenna array (e.g. enabling reception and/or transmission of more beams than one single beamforming circuit supports).

In embodiments of the present invention adapted for operating in transmission mode, the signal splitter/combiner is configured and operable to combine signals of the respective bypass channel and the one or more beamforming channels associated with the respective antenna port, to form a combined signal at the antenna port.

Alternatively or additionally, in embodiments of the present invention adapted for operating in reception mode, the signal splitter/combiner is configured and operable to split the signal of the respective antenna port to form duplicates thereof at the respective bypass channel and the one or more beamforming channels associated with the respective antenna port.

In some embodiments of the present invention the plurality of antenna elements is a subset of the antenna elements of the antenna array, and the beam forming circuit is adapted for beam forming signals associated with the subset of antenna elements. The at least one data bus connection of the beam forming circuit is configured and operable for connecting the beam forming circuit horizontally to one or more additional beam forming circuits that are associated with additional respective subsets of antenna elements of the antenna array. Accordingly, the data bus connection enables the beam forming circuit and the one or more additional beam forming circuits, which are horizontally connected thereto via the bus, to form the at least one beam together by utilizing the plurality of subsets of antenna elements of the antenna system. In this connection it should be noted that the phrases horizontal connections or horizontally connected and the like, are used herein interchangeably to designate the connection between beamforming circuits which are associated with different sets of antenna elements of an antenna array (e.g. enabling reception and/or transmission of beams by more antenna elements than one single beamforming circuit supports, In some embodiments of the present invention the antenna system is a scalable antenna system including a plurality of antenna panels, each comprising one of the subsets of the antenna elements.

In some embodiments each antenna panel is associated with one or more beam forming circuits connected in said vertical cascade to the antenna elements of the antenna panel. Each beamforming circuit of the vertical cascade may be connected horizontally to at least one other beam forming circuit which is in another vertical cascade associated with another antenna panel, and which may optionally be located at the same level in another vertical cascade of another antenna panel.

To this end, in some embodiments the beam forming circuit is configured and operable for enabling connection of the antenna I/O module to the antenna panel of a scalable antenna array. The beam forming circuit may be configured for implementing one or more of the following:
  The beam forming circuit may be configured and operable in transmission mode for transmitting signals through the antenna elements. In that case, the data bus connection is adapted for extracting certain beams' signals of the data-bus for provision of the signals to corresponding beam forming channels associated with the respective processing of the beams' signals; and
  The beam forming circuit may be configured and operable in reception mode for receiving signals through said antenna elements. In that case the data bus connection is adapted for combining the processed signals of the beamforming channels with the corresponding beams' signals communicated through the data bus;

The beam forming circuit may be configured and operable for implementing both reception and transmission modes as described above.

The beam forming circuit may be connected in this way with the one or more additional beam forming circuits in a "horizontal" connection.

In some embodiments the data-bus is analog and the data-bus connection includes one or more convertors between analog and digital. To this end the beam forming circuit may be configured for implementing one or more of the following:

The beam forming circuit may be configured and operable in transmission mode. The one or more convertors between analog and digital may include at least ADC adapted for extracting the certain beams' signals of the data-bus by converting the certain beams' signals from analog to digital form; and The beam forming circuit may be configured and operable in reception mode. The one or more convertors between analog and digital may include at least DAC adapted for converting the processed signals of the beamforming channels to analog form for communication through the data bus.

The beam forming circuit may be configured and operable for implementing both reception and transmission modes as described above.

In some embodiments where the beam forming circuit is configured and operable in reception mode and the data-bus is analog, the one or more convertors further comprise an ADC for converting at least the corresponding beams' signals of the data-bus from analog to digital form to thereby enable combining the processed signals of the beamforming channels with the corresponding beams' signals.

According to some embodiments of the present invention the data-bus is a digital bus. In some implementations the data-bus is a digital serial bus and the data-bus connection of the beam forming circuit includes one or more serializers/deserializers.

According to some embodiments of the present invention the antenna signal ports of the antenna I/O module of the beam forming circuit are analog ports capable of converting signals between digital and analog forms in at least one direction. Accordingly, the cascade ports of the cascade I/O module are analog ports capable of converting signals between digital and analog forms in at least an opposite direction. Accordingly, in some implementations the bypass channels and the one or more beamforming channels of the beam forming circuit are digital modules. Also, in some implementations the signal splitter/combiner of the beam forming circuit may be a digital module configured and operable for implementing said at least one of splitting and combining with reduced artifacts (reduced artifacts as compared to analog splitting/combining).

In some embodiments the beam forming circuit is adapted for connecting to a certain first number of antenna elements of an antenna system/panel, and is adapted for forming up to a certain second number of beams, each produced by the first number of antenna elements (e.g. by all of the first number of antenna elements). To this end the beam forming module of the beam forming circuit may include at least the second number of beam forming channels connected to each of the first number of antenna elements (e.g. static connection configuration between antenna ports and beamforming channels).

Alternatively or additionally, in some embodiments the beam forming module of the beam forming circuit includes a pool of the beam forming channels and a controllable connectivity network configured and operable for controllably connecting one or more beam forming channels of the pool with selected ones of the antenna elements (i.e. with selected antenna ports of the circuit). This may enable dynamically adjusting complex beam forming operations.

In some embodiments the antenna I/O module of the beam forming circuit is adapted for connecting directly to the plurality of antenna elements via said signal feeding ports of the plurality of antenna elements, or via an RF front end module(s) of the plurality of antenna elements. The antenna I/O module is also adapted for connecting indirectly to the plurality of antenna elements by connecting to a cascade I/O module of another beam forming circuit in the "vertical" cascade of beam forming circuit, which is in turn connected, directly or indirectly, to the plurality of antenna elements.

According to another broad aspect of the present invention there is provided a beam forming circuit, adapted for operating in reception mode. The beam forming circuit includes:

an antenna I/O module comprising a plurality of antenna ports for connecting directly or indirectly for obtaining signals received by a plurality of antenna elements of an antenna system;

a signal splitter/combiner module comprising a plurality of signal splitters connectable to the antenna ports, wherein each signal splitter is adapted to split the signals received by an antenna port connected thereto to from at least two replicas (duplicates);

a beam forming module comprising a plurality of beam forming channels each being connectable to an antenna port of the antenna ports via at least one of the signal splitters of the signal splitter/combiner for receiving a duplicate/replica signal of the antenna port. Each beam forming channel is configured and operable for processing the signals received from the antenna port for introducing thereto a controllable shift, being at least one of a time delay and phase shift, to thereby enable beamforming of signals received by the plurality of antenna elements by combining the time and/or phase shifted signal of the antenna element associated with the antenna port with time and/or phase shifted signals of other antenna elements;

a data bus connection connected to said beamforming module and connectable to a data-bus and configured and operable for receiving time and/or phase shifted signals from the beam forming channels of the beamforming module and encoding said time and/or phase shifted signals on the data-bus, thereby communicating one or more beams' signals indicative of a data stream of at least one beam through said data-bus; and a cascade I/O module comprising a plurality of cascade ports associated with corresponding bypass channels which are connected respectively to said plurality of antenna ports via respective signal splitters of said signal splitter/combiner. Accordingly, each cascade port obtains the replica of the signals received by the respective antenna port to which it is connected.

The cascade I/O module thereby enables to connect to the beam forming circuit, to one or more additional beam forming circuits, in a "vertical" cascade, for forming, by the beam forming modules of the one or more additional beam forming circuits, one or more additional beams, in addition to said at least one beam.

In some embodiments the antenna ports include analog to digital converters (ADCs) configured and operable for converting analog signals obtained from the antenna elements to digital representation at which those signals are processed by the beamforming circuit. In some embodiments the cascade ports include digital to analog converters (DACs) configured and operable for converting signals received in digital form from the corresponding bypass channels to output said signals in analog form via the cascade ports.

In some embodiments the data bus connection of the beamforming circuit is adapted for combining the time and/or phase shifted signals being processed by the beam forming channels with the corresponding beams' signals communicated through the data bus, thereby enabling to connect to the beam forming circuit, with the one or more additional beam forming circuits in the "horizontal" connection.

In some implementations the data-bus is analog and the data-bus connection comprises one or more convertors between analog and digital. The one or more convertors between analog and digital may include at least DAC adapted for converting the processed signals of the beamforming channels to analog form for communication through the data bus. In some implementations the one or more convertors further include ADC(s) for converting at least the corresponding beams' signals of the data-bus from analog to digital form to thereby enable the combining of the time and/or phase shifted signals being processed by the beam forming channels with the corresponding beams' signals.

According to some embodiments, the data-bus is a digital bus. In some implementations the data-bus is a digital serial bus and the data-bus connection includes one or more serializers/deserializers (SerDes).

According to yet another broad aspect of the present invention there is provided a beam forming circuit adapted for operating in transmission mode. The beam forming circuit includes:
  a data bus connection connectable to a data-bus and adapted to decode from the data-bus, one or more beams' signals indicative of data streams of one or more beams to be transmitted by antenna elements of an antenna array;
  a beam forming module including a plurality of beam forming channels connectable to the data bus connection for receiving said one or more beams' signals of the one or more beams. The beam forming module includes one or more beamforming channels adapted to receive a beams' signal associated with a data stream of at least one beam of the one or more beams and is configured and operable for introducing controllable respective shifts, being at least one of respective time delays and respective phase shifts, to the beams' signal, thereby forming one or more time and/or phase shifted signals adapted for forming the beam (i.e. upon transmission of the one or more time and/or phase shifted signals by antenna elements of an antenna array); and
  an antenna I/O module including a plurality of antenna ports for connecting directly or indirectly to one or more antenna elements of an antenna system.

According to the present invention, the beam forming circuit includes a cascade I/O module including a plurality of cascade ports. The beam forming circuit includes a signal splitter/combiner module including one or more signal combiners. Each signal combiner is connectable from one end thereof to an antenna port of the antenna ports, and from another end thereof to at least one beamforming channel of the beamforming channels and to at least one cascade port of the cascade ports via a bypass channel associated with said cascade port. The signal combiner is adapted for combining the signals of said at least one beamforming channel and the at least one cascade port for providing the combined signal to the antenna port. Accordingly the cascade I/O module enables to connect to the beam forming circuit, with one or more additional beam forming circuits, in a "vertical" cascade, for forming, by the beam forming modules of the one or more additional beam forming circuits, one or more additional beams, in addition to said at least one beam.

According to some embodiments of the beam forming circuit operable in the transmission mode, the antenna ports include digital to analog converters (DACs) configured and operable for converting digital signals obtained from the splitter combiner module of the beamforming circuit to corresponding analog signals to be provided to respective antenna elements via the antenna ports. The cascade ports may include analog to digital converters (ADCs) configured and operable for converting signals received in analog form from antenna ports of another beam forming circuit, in to corresponding digital signals to be communicated via said bypass channels to said splitter combiner module.

In some embodiments the beam forming circuit is configured and operable for enabling connection of the antenna I/O module to the antenna panel of a scalable antenna array for transmission of a signal thereby. The data bus connection is adapted for extracting certain beams' signals of the data-bus for provision of the signals to corresponding beam forming channels.

In some implementations the data-bus is analog and the data-bus connection comprises one or more convertors between analog and digital comprising at least ADC adapted for extracting the certain beams' signals of the data-bus by converting the certain beams' signals from analog to digital form.

In some implementations the data-bus is digital. For instance, the data-bus may be a digital serial bus and the data-bus connection may include one or more serializers/deserializers.

Optionally, an any of the above described embodiments/aspects of the present invention, the beam forming channels of the beam forming circuit may be further configured and operable for adjusting a gain of the signals processed thereby, and thereby enable enhanced beam forming with reduced side lobes and/or improved beam shaping (e.g. tapering).

Optionally, in any of the above described embodiments/aspects of the present invention, the beam forming circuit may be configured as an integrated circuit (chip). e.g., a configured beam forming circuit may be configured as an ASIC.

According to further yet another broad aspect of the present invention there is provided an antenna system including a plurality of antenna elements arranged in an array. The antenna system of the present invention includes, per each subset of one or more antenna elements, a vertical cascade of one or more beamforming circuits connected, directly or indirectly, to the one or more antenna elements of the subset. The one or more beamforming circuits of the vertical cascade may be configured and operable for at least one of transmitting and receiving signals by the antenna elements of the subset.

In some embodiments the vertical cascade of the beamforming circuits is connected indirectly to the one or more antenna elements of the subset, via an RF front-end module of the antenna system. More specifically for example, an antenna I/O module of a first one of the beamforming circuits of the vertical cascade is connected to the RF front-end module, and the RF front-end module is connected to RF feeding ports of the one or more antenna elements of the subset.

To this end the antenna system may include one or more RF front-end modules connected to the antenna elements of the antenna system. The plurality of antenna elements of the antenna system may include one or more subsets, each subset being associated with at least one respective vertical cascade of one or more beamforming circuits. The one or more RF front-end modules may optionally be respectively connected to one or more respective subsets of antenna elements. According to some embodiments the subsets of the antenna elements are configured in respective antenna panels.

In some embodiments of the present invention the respective vertical cascade of one or more beamforming circuits of at least one subset of said subsets includes at least two beamforming circuits arranged in the vertical cascade. A first beamforming circuit of the at least two beamforming circuits is connected, directly or indirectly, via a front-end module, to the antenna elements of the at least one subset for receiving or transmitting signals thereby, and at least a second beamforming circuit of the at least two beamforming circuits is connected indirectly and via the first beamforming circuit, to the antenna elements of the at least one subset, thereby receiving or transmitting signals from/to the antenna elements of the subset via the first beamforming circuit. In some implementations the respective vertical cascade includes more than two beamforming circuits arranged in the vertical cascade. In such implementations, each subsequent beamforming circuit in the vertical cascade, except the first beamforming circuit, is connected indirectly to the antenna elements of the at least one subset, via at least the beamforming circuit preceding it in the vertical cascade.

According to some embodiments, the antenna system of the present invention includes a plurality of subsets of antenna elements each associated with its respective vertical cascade of beamforming circuits. To this end, in some implementations each beamforming circuit of the respective vertical cascade is connected horizontally to at least one other beam forming circuit being a member of a vertical cascade of another one of the subsets of antenna elements. The antenna system may include at least one data bus implementing the horizontal connection in between beam forming circuits of different vertical cascades.

According to some embodiments of the antenna system of the present invention each vertical cascade of beamforming circuits, which is connected to a respective subset of antenna elements, comprises two or more beamforming circuits arranged in two or more respective vertical levels. The antenna system may include two or more data buses implementing respective horizontal connections in between beam forming circuits of different vertical cascades, such that each data bus provides horizontal connections between corresponding beamforming circuits of different vertical cascades. Optionally, each data bus communicates data of a certain number of beams to be transmitted or received by the antenna elements of the subsets that are directly or indirectly connected to the beam forming circuits to which said data bus is connected via the horizontal connection.

In some implementations, each subset of the plurality of subsets of antenna elements with its respective vertical cascade of beamforming circuits is configured as a separate antenna panel. Each separate antenna panel may include a respective RF frontend module connecting between the subset of antenna elements of the antenna panel and the vertical cascade of beamforming circuits thereof.

According to some embodiments of the present invention, the beamforming circuits included in the antenna system are configured and operable according to any one of the above described configurations of beamforming circuits of the present invention.

The present invention thus provides a novel and inventive beam forming circuit and a novel and inventive antenna system enabling to scale the antenna system both horizontally (to flexibly include a designated number of antenna elements), and vertically to enable production of a designated number of beams Various possible implementations of the present invention are described in more detail below with reference to the drawings.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1A:
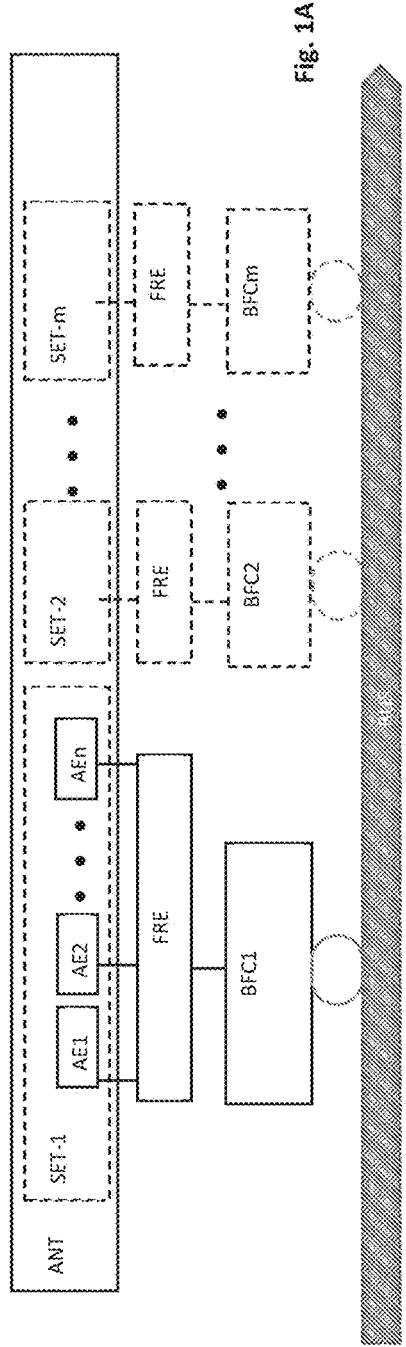
FIGS. 1A and 1B schematically illustrate two conventional digital beam forming architectures.
Figure 1B:
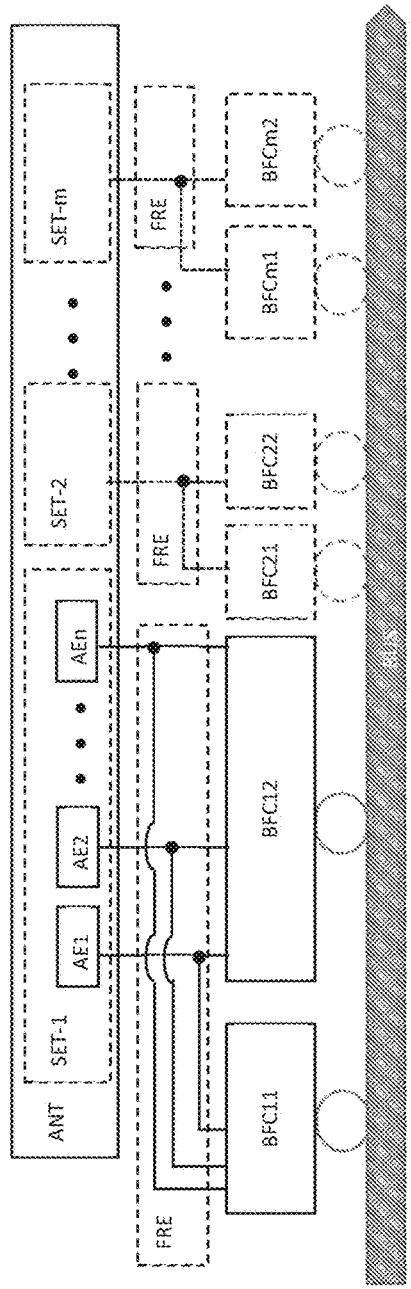
Figure 2A:
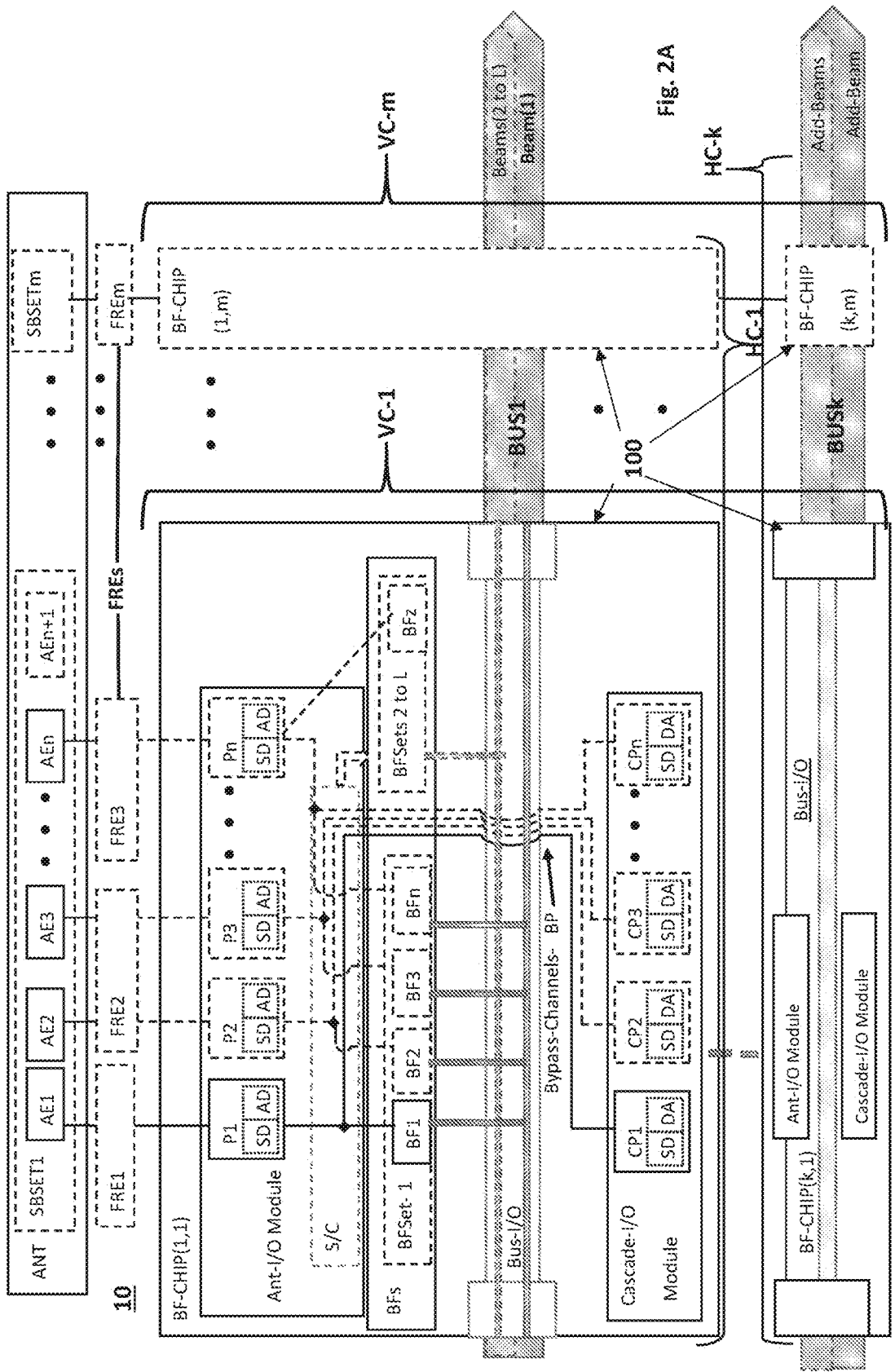
FIGS. 2A and 2B are, respectively, a block diagram and a schematic perspective view illustration showing the configurations of a scalable beam forming circuit/chip and a scalable beam forming system implemented with such scalable beam forming circuit(s)/chip(s), according to embodiments of the present invention, for providing scalability with respect to both the number of antenna elements and the number of beams which can be concurrently processed by the system.
Figure 2B:
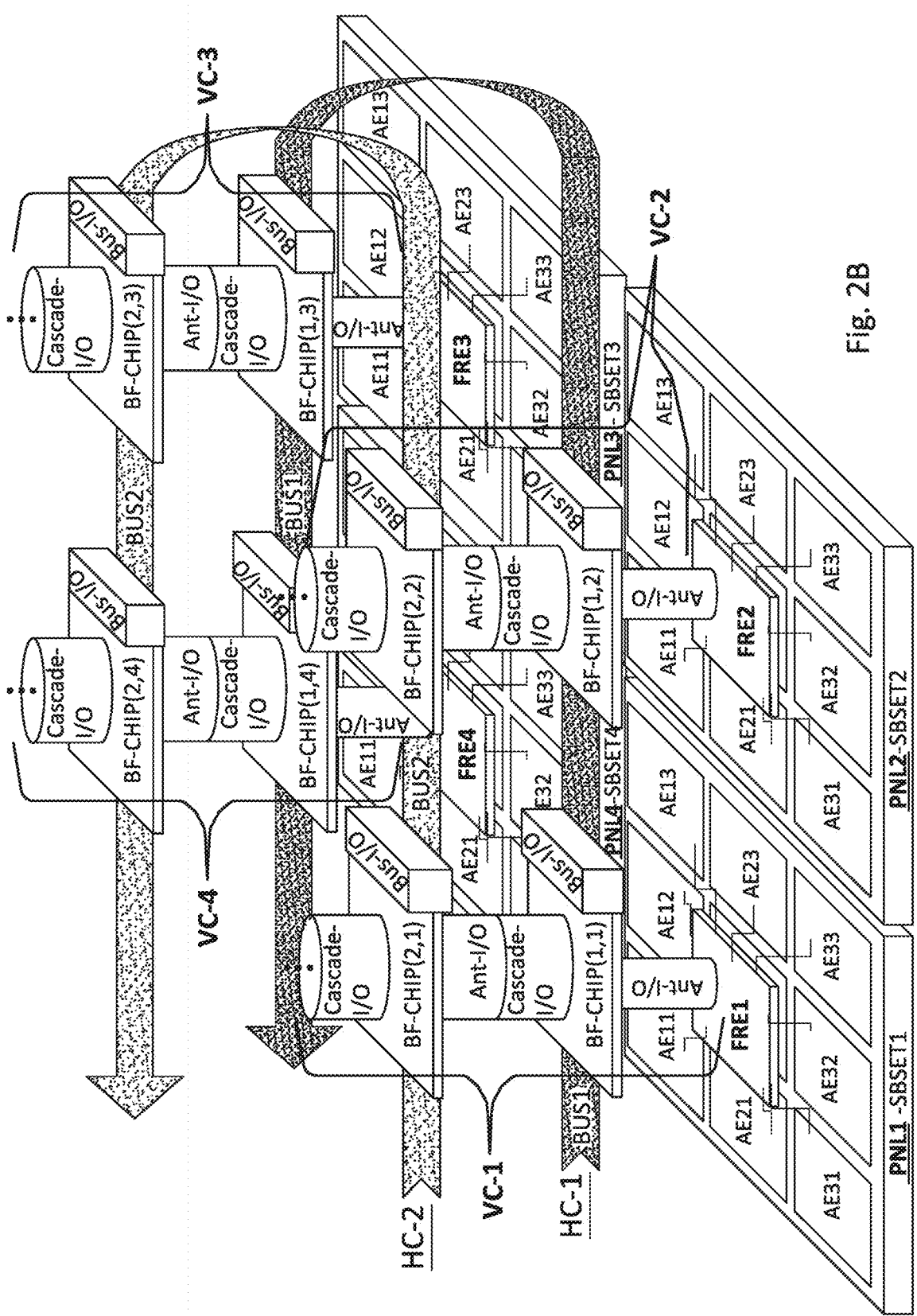

Reference is now made together to FIGS. 2A and 2B, each showing a digital beam forming system 10 according to an embodiment of the present invention including one or more (generally a plurality of) beam forming circuits/chips 100 connected directly or indirectly to the antenna elements of an antenna array ANT. More specifically, FIG. 2A is a block diagram showing a scalable beam forming system 10 and a scalable beam forming circuit(s)/chip(s) 100, configured according to embodiments of the present invention. The scalable beam forming system 10 is adapted to be scalable with respect to the number of beams that can be processed (transmitted or received) concurrently by the system, and is optionally also scalable with respect to the number of antenna elements, which can be incorporated with (e.g. connected to) the system for transmitting or receiving the multiple beams. FIG. 2B is a schematic perspective view of the scalable beam forming system 10 showing the beam forming circuit(s) 100 implemented specifically as separate monolithic integrated circuits (e.g. as chips, with or without packaging). It should be understood that the elements/modules in the figures are depicted illustratively and are not necessarily shown in their actual shape or scale (e.g. the various I/O modules illustrated for example in FIG. 2B are emphasized for the purpose of illustrative clarity).

Figure 3:
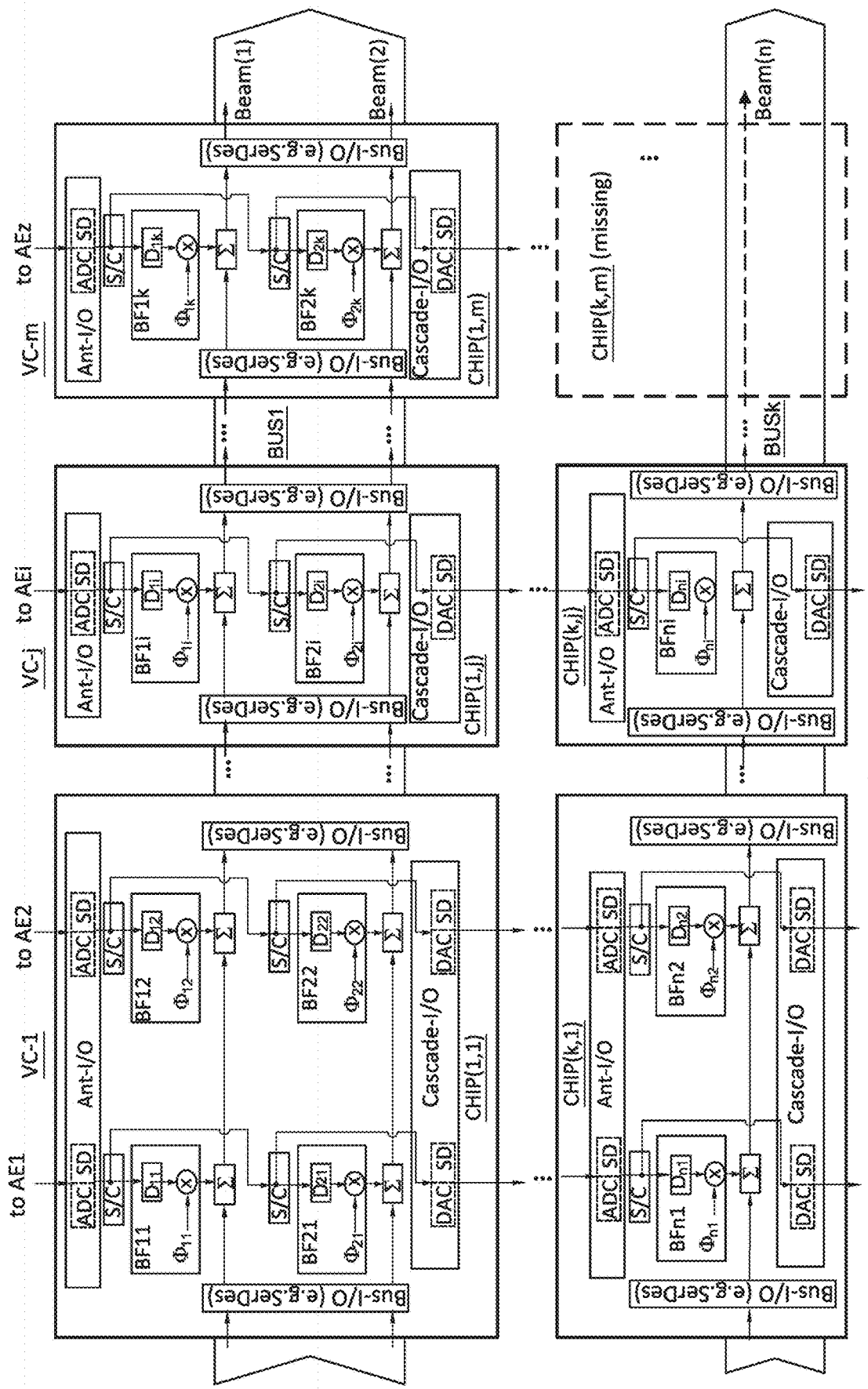
FIG. 3 shows a block diagram illustrating a scalable beam forming system implemented with beam forming circuits according to an embodiment of the present invention according to an example embodiment of the present invention, and adapted for reception of multiple beams, by which the maximal number of concurrent received beams can be flexibly increased or decreased by adding or removing beam forming circuits/chips in a cascade.
Figure 4:
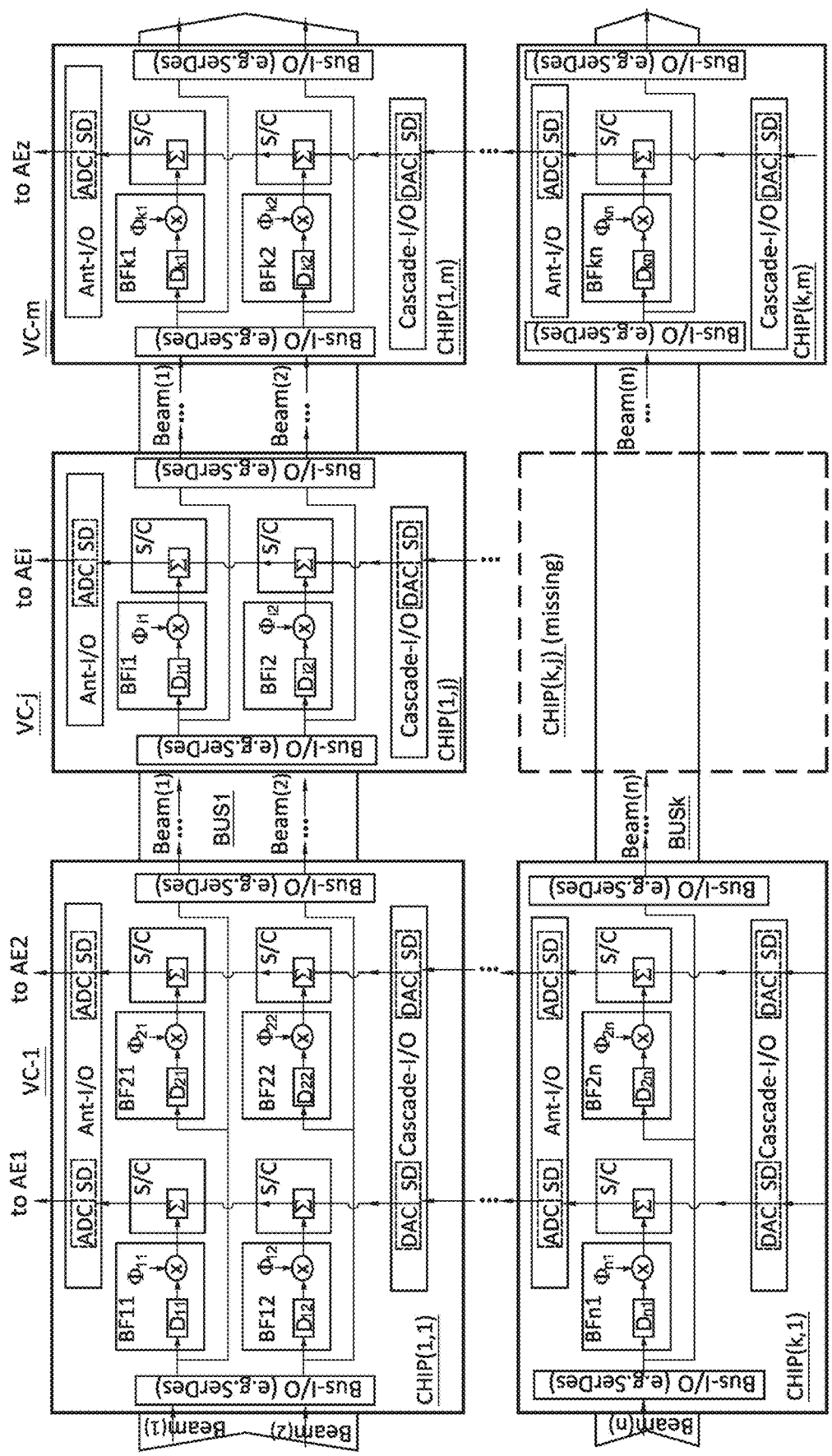
FIG. 4 shows a block diagram illustrating a scalable beam forming system implemented according to an example embodiment of the present invention for transmission of multiple beams, by which the maximal number of concurrent received beams can be flexibly increased or decreased by adding or removing beam forming circuits/chips in a cascade.

In this regard it should be noted that the phrases beam forming circuit(s) and/or beam-forming chip(s) used herein should be construed broadly as referring to generally any implementation of electronic circuits made according to the principles of the present invention, as shown and exemplified in detail, for example with reference to BF-CHIP(1,1) in FIG. 2A and in FIGS. 3 and 4. This is regardless of whether such circuits are implemented as a monolithic integrated circuit (chip form) or not.

In this connection, it should also be understood that in some embodiments of the present invention, it may be advantageous to implement the beam forming circuit(s) in the form of monolithic integrated circuits, e.g. as illustrated in FIG. 2B, BF-CHIP(1,1) to BF-CHIP(2,4). This is because such implementation may improve the scalability of the system also by allowing in-situ assembly (e.g. per demand so as to enable adding or removing antenna subsets, e.g. adding/activating or removing/deactivating any of the SBSET1 to SBSETm of FIG. 2A or similarly adding or removing antenna panels, e.g. PNL1 to PNL4 which include such subsets). Accordingly, the technique of the present invention allows to increase or reduce the number of antenna elements participating in beam formation, and/or add or remove vertical cascades of beamforming circuits/chips (i.e. increase or decrease the number k of vertical cascade levels) in order to increase or reduce the maximal number of concurrent beams supported by each respective subset/panel of the antenna elements. However, it should be understood that implementing the beam-forming circuit(s)/chip(s), e.g. BF-CHIP(1,1) to BF-CHIP(k,m) as a monolithic integrated circuit is not essential to the general technique of the present invention.

Thus, advantageously, the antenna system 10 of the present invention, configured with the beam-forming circuit(s)/chip(s) 100, provides scalability of the beam forming system with respect to both the number of antenna elements and the number of beams which can be processed concurrently by the system 10.

The beam forming circuits/chips 100 are arranged in vertical cascades VC-1 to VC-m that are connected to respective subsets SBSET1 to SBSETm of antenna elements. As will be described in more detail below, the arrangement of the beam forming circuits/chips in vertical cascades allows connecting additional beam forming circuits/chips to each subset of antenna elements, thereby providing scalability in terms of the number of beams that can be transmitted/received by the system (as each beam forming circuit/chip may be limited in the number of beams it can handle/form; addition of more beam forming circuit(s)/chip(s) in the vertical cascade enables the handling, transmission or reception, of more beams). The beam forming circuits/chips of a certain vertical cascade, e.g. BF-CHIP(1,1) to BF-CHIP(k,1) of VC-1, are also configured for connecting together horizontally, to beamforming circuits/chips of other vertical cascades, e.g. VC-2 to VC-m (e.g. BF-CHIP(1,m) to BF-CHIP(k,m) of VC-m), which are responsible for the beamforming of signals of other subsets of the antenna elements of antenna array ANT, e.g. SBSET2 to SBSETm.

It should be noted that although not specifically illustrated in FIGS. 2A and 2B, the vertical cascades VC-1 to VC-m may generally include different numbers of beamforming circuits/chips in each vertical cascade. Indeed, including the same number of beamforming circuits/chips of the same type/abilities, may provide that all the vertical cascade are equal in the number of beams they can process (transmit or receive). However, as not necessarily all beams should be transmitted or received by all the antenna elements of the antenna array (e.g. beams for which less accurate directionality or less suppressed side lobes are required may be transmitted or received by only parts of the antenna elements) accordingly, in some implementations some vertical cascades are configured (e.g. with many beamforming circuits/chips) to enable them to handle the transmission or reception of a large number of beams, while other vertical cascades may be configured with a lesser number of beamforming circuits/chips (e.g. as few as one) so that these vertical cascades may be used/participate in the transmission or reception of those beams which need to be transmitted/received with improved directionality (e.g. transmitted received by all or large number of the antenna elements). This feature of the invention is exemplified in FIGS. 3 and 4 where some beamforming circuits appear to be "missing".

The horizontal connections between the beamforming circuits/chips of different vertical cascades, e.g. (e.g. horizontal connection between BF-CHIP(1,1) to BF-CHIP(1,m); and between BF-CHIP(k,1) to BF-CHIP(k,m) and so forth), provides scalability in terms of the number of antenna elements (e.g. or subsets thereof) that can be incorporated in the antenna system 10. The horizontal connection between beamforming circuits/chips 100 of different vertical cascades may be implemented via one or more data buses (e.g. BUS1, BUS2 to BUSk shown in the non-limiting examples of FIGS. 2A and 2B). The data busses carry the data-contents of the beams which are transmitted/received by the antenna system 10, and possibly also related parameters thereof such as beamforming parameters, e.g. the respective directions by which they should be transmitted/received by the beam forming system 10, their focusing properties if any, and their carrier frequencies, or other properties, by which the beamforming circuits/chips are operated. For example, BUS1 carries the data which is transmitted/received by Beam(1) (and possibly of data additional 2 to L beams), as well as information regarding the direction for propagation of the beam(s), e.g. of Beam(1), (from where should it be received or to where it is transmitted), in between the beam forming circuits/chips BF-CHIP(1,1) to BF-CHIP(1,m) of the first level in the vertical cascades VC-1 to VC-m. In turn, the beam forming circuits/chips BF-CHIP(1,1) to BF-CHIP (1,m) that are connected horizontally to the data-bus BUS1 operate for transmitting or receiving the beam Beam(1) (and possibly of data additional 2 to L beams), operate according to beamforming principles for forming the beam(s) Beam(1) (and optionally also beams 2 to L), e.g. beam Beam(1) in the desired direction(s) of the beams (as received from the data-bus BUS1. Beamforming is performed by utilizing a beamforming channel (e.g. one of the channels BF1 to BFz), per each beam and each antenna elements participating in its reception/transmission, for applying proper time delays and/or proper phase shifts and/or amplitude gains to the data/signals which are received or transmitted by the respective antenna element. It should be noted here that the term "beamforming" is used herein to designate the collective operation of several beamforming channels (phase shifters/time delays/gains) on the same data to be transmitted/received by several antenna elements associated/connected with the several beamforming channels respectively. Accordingly, as generally known from beam-forming principles, the respective beam is formed when the signals of the plurality of antenna elements are combined after being properly time-delayed/phase-shifted/amplified by respective beamforming channels, according to the direction and properties of the beam, e.g. beam(1) (e.g. the signals are combined in free space propagation during transmission mode, or combined at the data-bus thereafter, in reception). To this end, the beamforming circuits/chips of each level of the vertical cascades, which are connected horizontally, may be used/configured for forming at least one beam (in some cases a plurality of beams), whereby the configuration of the beamforming circuits/chips may be adapted for transmission or for reception of the beams, or for combined transmission and reception of beams. The beamforming circuits/chips of additional level of the vertical cascades, which may also be connected horizontally between them, may also be used for forming additional beams transmitted or received in their respective directions, thus providing scalability in the number of beams which can be formed by the system 10.

To this end, it should be understood that the technique of the present invention may be implemented for applying beamforming in transmission mode, reception mode, or in combination of these modes. Non-limiting examples of the configuration and operation of the beamforming system 10 and also specifically of the beamforming circuits/chips 100 for transmission mode operation, are provided below with reference to FIG. 4. Non-limiting examples of the configuration and operation of the beamforming system 10 and also specifically of the beamforming circuits/chips 100 for reception mode operation are provided below with reference to FIG. 3. In this connection it should be noted that according to the present invention, the beamforming itself, i.e. the manner by which the signals of the different antenna elements are time delayed/shifted, phase shifted and amplified by the beamforming circuits in order to obtain a beam from a certain direction (and possibly also with certain finite focusing), can be implemented by any suitable beamforming techniques. For example, for achieving data transmission or reception with accurate beamforming over large antenna arrays, digital baseband beamforming (e.g. utilizing true time delay (TTD) modules and phase shifters operating on the baseband frequency components of the transmitted/received signals, are described for example in WO 2017/153985 co-assigned to the assignee of the present application and incorporated in reference herein. Also, the efficient implementation and cost effective architecture of TTD for multiple beams as described for instance in WO 2019/142197, co-assigned to the assignee of the present application incorporated herein in reference, may be used/implemented in the beamforming chip/circuit of the present invention. Additionally, in cases where multibeam transmission or reception with improved polarization controlled is needed, the beamforming technique used may be combined with the polarization control technique disclosed for instance in IL Patent Application No. 267203 co-assigned to the assignee of the present application. Those versed in the art would readily appreciate, based on the description herein and the disclosures of the above referenced applications, how to implement the above-mentioned techniques in the beamforming chip/circuit 100 of the present invention, or in its beamformer channels BFs. Yet alternatively or additionally, as would generally be appreciated by those versed in the art, some implementation of the beamforming circuits/chips of the present invention may be based on digital or analogue beamforming operating on the carrier frequency component of the beams or an intermediate frequency component between the baseband and the carrier frequency, and/or may be based on In-Phase and Quadrature modulations as generally known to be used in beamforming. Accordingly, as would be appreciated by those versed in the art, the beam forming channels BFs depicted herein may in some embodiments be configured and operable for processing signals in In-Phase and Quadrature modulation forms and introducing proper time-delays/phase-shifts/gains to such signals according to any suitable beamforming principles.

As it would also be understood by those versed in the art that the configuration and operation of the optional RF front-end modules FREs e.g. FRE1 to FREm, in cases where such modules are incorporated in the beamforming/antenna system 10, are generally adapted to matching to the specific beamforming technology used. As generally known, RF-front-ends are typically analogue circuits including amplifiers and/or frequency mixers (up/down convertors), filters, phases shifters and/or other analog components that are used for processing the signals which are inputted or outputted from the antenna feeding ports. Thus, for instance, in cases where baseband or intermediate-band beamforming is implemented, the RF-front-end modules FREs are configured for converting the signals from the carrier frequency band at which it is transmitted/received by the antenna and the base or intermediate band at which it is processed by the beamforming circuits/chips 100. In case of direct RF implementation of the beamforming circuits/chips 100 (i.e. beam forming performed on the carrier band), frequency conversion by the FREs may not be required, but filtering and amplification functions may be implemented by the FREs. Optionally, in case of dual polarized antenna elements, the FREs may also be configured and operable for properly switching and/or phase shifting the signals of the different polarizations, as described, for example in IL Patent Application No. 267203. In case separate transmit and receive antennas are used, a switch or a diplexer unit may be also be included in the FREs.

According to the invention, each of the vertical cascades VC-1 to VC-m of the antenna system 10 (e.g. VC-1 to VC-4 in FIG. 2B) is responsible for applying the beam forming processing to the signals which are provided to or from its respective subsets of antenna elements, SBSET1 to SBSETm of the antenna system 10 (e.g. in the specific non-limiting example of FIG. 2B, VC-1 to VC-4 are connected respectively to the subsets SBSET1 to SBSET4 of antenna elements which are arranged in separate respective antenna panels PNL1 to PNL4).

Each beamforming chip/circuit, e.g. BF-CHIP(1,1), in the vertical cascade, e.g. VC-1, is responsible for beamforming a certain number of beams, whereby the number of beams may be limited by the number z of beamformer channels BFS (hereinafter beamformers) included in the beamforming chip/circuit and/or by the data capacity of the data-bus (e.g. BUS1), which is connected to the beamforming chip/circuit e.g. BF-CHIP(1,1), to communicate the beams' data. For instance, in case each beam processed by the beamforming chip/circuit BF-CHIP(1,1) should be transmitted or received by all the n antenna elements, AE1 to AEn, of the respective subset, SBSET1, (regardless of whether the same beam is also transmitted/received by antenna elements of other subsets) and the beamforming chip/circuit BF-CHIP (1,1) includes z beam formers, BF1 to BFz, then by the first condition the maximal number of beams transmitted or received in this way may not exceed the integer part of the ratio of z/n. For instance as exemplified in FIG. 2A, the set BF-SET-1 of beamformers BF1 to BFz is shown to be used producing a single beam via all the n antenna elements of the subset SBSET1, and thus accordingly only the rest, z-n of the beamformers BF1 to BFz may be allocated/used (e.g. in BFSets 2 to L) for producing additional beams. However, this may be achieved only as long as the capacity of the data bus BUS1, or of its connection to the beamforming chip/circuit BF-CHIP(1,1), supports enough beams (e.g. Beam(1) plus Beams(2 to L)).

To overcome these limitations, according to the present invention the vertical cascade of chips beam forming chips/circuits is used. Accordingly, even if each beamforming chip or its data-bus connection is limited by the number of beams, it supports transmitting or receiving as many as required, by connecting the plurality of beamforming chips in the vertical cascade.

In this connection, it should be understood that the phrases/terms vertical cascade" and/or vertical connection or the like, made with reference to the connection between beam forming circuits/chips, pertain to data or signal connection between the beamforming circuits, as in VC-1. Where at least two beamforming circuits/chips are arranged in such a vertical cascade, i.e. connected vertically such as BF-CHIP(1,1) to BF-CHIP(k,1) of VC-1, the first beamforming circuit/chip of these at least two beamforming circuit/chips, e.g. BF-CHIP(1,1), is connected (e.g. directly, or indirectly via RF-frontend module (e.g. RFE)) to respective antenna elements AE1 to AEn (i.e. to SBSET1) of the antenna system ANT for communicating thereto or therefrom respective data/signals which are to be respectively transmitted or received by the antenna elements associated with the vertical cascade VC-1. In turn, the second beamforming chip/circuit of the vertical cascade, e.g. BF-CHIP (2,1) is also connected to the respective antenna elements AE1 to AEn (i.e. to SBSET1) of the antenna system ANT for communicating thereto or therefrom respective data/signals to be respectively transmitted or received by the antenna elements of the subset SBSET1. However, in such a vertical connection/cascade, the second beamforming chip/circuit (as well as any other beamforming chips/circuits of the vertical cascade) is connected indirectly and via the first beamforming circuit/chip, to the antenna elements to antenna elements of SBSET1 (or to their RF-front-end module(s) RFEs). As for said any other beamforming chips/circuits of the vertical cascade (if more than two are included in the vertical cascade), these are all connected to the antenna elements of SBSET1 via the first beamforming circuit/chip. Generally, the vertical connection is made in linear topology. In typical implementations, the connection of such additional beamforming circuits/chips is made in a series/chain, such that each subsequent beamforming circuit/chip in the vertical cascade (except the first beamforming chip), is indirectly connected to the antenna elements of the subset SBSET1, via the beamforming circuit/chip preceding it in the vertical cascade (and accordingly also via the beamforming circuit(s)/chip(s) that precedes the preceding beamforming circuit/chip).

Typically, the beamforming circuits/chips of the vertical cascade, e.g. VC-1, are connected in non-branched linear topology in the vertical cascade as shown. Each beamforming circuit/chip includes a chip cascade I/O module Cascade-I/O, by which it may be connected vertically to an additional beamforming circuit/chip of the vertical cascade, and an antenna I/O module Ant-I/O by which it may be connected to antenna elements of the antenna system ANT (e.g. directly or via an RF frontend thereof) or a chip cascade I/O module Cascade-I/O of a beamforming chip/circuit preceding it in the vertical cascade, as shown in VC-1. The cascade I/O module Cascade-I/O and the antenna I/O module Ant-I/O are connected to one another within the respective beamforming chip/circuit by bypass-channel(s) BP for communicating signals/data therebetween, as will be described in more detail below. In this regard, the signal/data communicated by bypass-channel(s) BP between the cascade I/O module Cascade-I/O and the antenna I/O module Ant-I/O of a certain beamforming chip/circuit, are generally not processed per-se by the certain beamforming circuit/chip (i.e. are not processed for applying beamforming time delays, phase shifts and/or gains thereto), except for optionally being merged/split out from data or signals that are processed by the certain beamforming chip/circuit and optionally converted to different representations (e.g. from analog to digital, or vice versa).

Thus, in a non-branched linear topology, as specifically illustrated in the non-limiting example of FIGS. 2A and 2B, a certain beamforming chip/circuit may only include a single cascade I/O module Cascade-I/O and a single antenna I/O module Ant-I/O.

It should be however noted that in some embodiments of the present invention, the beamforming chip(s)/circuit(s) 100 and the antenna system 10 including them, are configured with branched linear topology implementation of one or more vertical cascade(s). In such embodiments, which are not specifically illustrated in FIGS. 2A and 2B for clarity, at least one beamforming chip/circuit 100 supporting the branched linear topology (which may be included in such system 10) is configured with multiple cascade I/O modules Cascade-I/O to which multiple (e.g. two or more) beamforming chips/circuits may be respectively connected via their antenna I/O modules Ant-I/O. The multiple cascade I/O modules Cascade-I/O of the at least one beamforming chip/circuit supporting the branched linear topology are connected to the antenna I/O module Ant-I/O of that at least one beamforming chip/circuit 100 by respective bypass-channels which are generally combined/split at, or, near the side of the antenna I/O module Ant-I/O. Such implementation of the present invention, although not being specifically illustrated, would be readily appreciated and understood by those versed in the art, in view of the description of the present invention herein.

Thus referring specifically to the beamforming chip/circuit BF-CHIP(1,1) illustrated in details in FIG. 2A, the beamforming chip/circuit of the present invention includes an antenna I/O module Ant-I/O by which the beamforming chip/circuit BF-CHIP(1,1) connects directly or indirectly to its respective antenna elements, e.g. to subset SBSET1. The beamforming chip/circuit BF-CHIP(1,1) includes a data bus connection Bus-I/O by which it is connected to a data bus, e.g. BUS1, for communicating data/signals indicative of at least one beam production by the beamforming chip/circuit.

In between the data bus connection Bus-I/O and antenna ports, P1 to Pn, of the antenna I/O module Ant-I/O, the beamforming chip/circuit BF-CHIP(1,1) includes a beam forming module BFs including a plurality of beam forming channels/circuits, e.g. BF1 to BFz, which are configured and operable to process signals communicated between the bus connection Bus-I/O and the antenna ports, P1 to Pn, for introducing controllable shifts (time delays, gains and/or phase shifts) to the signals processed thereby so as to beamform the processed signals. In some embodiments of the present invention the beam forming channels/circuits, e.g. BF1 to BFz, of the beamforming chip/circuit BF-CHIP(1,1) may be configured and operable for forming multiple beams to be transmitted or received by all or some of the antenna elements AE1 to AEn (i.e. of SBSET1) which are associated with the beamforming chip/circuit BF-CHIP(1, 1). Alternatively, or additionally, in some embodiments the beam forming channels/circuits, e.g. BF1 to BFz may be configured specifically for forming at least one beam (e.g. a single beam) by the antenna elements AE1 to AEn (i.e. of SBSET1).

In this regard, in general, and specifically in embodiments where the beam forming channels/circuits, BF1 to BFz, are configured and operable for forming multiple beams, the beam forming channels BF1 to BFz of the beamforming circuit/chip may be arranged in a pool BFS of beam forming channels and may be dynamically allocated to antenna elements and/or beams via a connectivity network, such as the network of splitters or combiners S/C shown in FIG. 2A. In this regard it should be understood that not necessarily all transmitted or received beams are formed by all the antenna elements. For instance, a beam may be in some cases transmitted or received only by some of the antenna elements of the system 10, or of the subset that is connected to the beamforming circuit. For example one or more beam(s) may be transmitted/received only by half of the antenna elements, while beamforming channels/circuits associated with the other half of the antenna elements may be used for transmitting or receiving different beam(s). Accordingly, using a pool-wise scheme of the beamforming channels allows dynamic allocation of the beamforming channels to antenna elements and beams, and thus provides further improved flexibility in the number of beams that can be transmitted or received by the system, with its given resources. In some embodiments such a pool-wise scheme is implemented by configuring the splitter/combiner module S/C as a network of controllable splitters or combiners (splitters in reception mode/configuration and combiners in transmission mode/configuration) which can be controlled for allocating/connecting associating one or more of the beamforming channels to each antenna element of the subset.

As indicated above, according to the present invention the beam forming chip includes a chip cascade I/O module Cascade-I/O connected to the antenna I/O module Ant-I/O via bypass channel(s) BP. The chip cascade I/O module Cascade-I/O enables connection (i.e. referred to herein as vertical connection) of additional beamforming circuits, BF-CHIP(k,1) to the elements of the antenna ANT (e.g. to subset SBSET1) via the beamforming chip/circuit BF-CHIP(1,1). Typically the antenna I/O module Ant-I/O includes a plurality of antenna ports, e.g. P1 to Pn, for connecting directly or indirectly to a plurality of antenna elements, e.g. AE1 to AEn, and the cascade I/O module Cascade-I/O includes a plurality of chip cascade ports, e.g. CP1 to CPn for connecting the beamforming chip/circuit BF-CHIP(1,1) of other additional beamforming circuits, e.g. BF-CHIP(k,1) which should be connected to the same antenna elements respectively.

It should be noted here that the term port is used in the disclosure of the present application to refer to generally to any type of port, which may be a physical signal port (analog or digital) by which electronic elements/circuits may be connected, or a virtual port (e.g. digital port) which may be represented by a port number/address by which specific data channels/streams can be encoded/multiplexed or decoded/demultiplexed/extracted from a certain data/physical channel such as a data-bus.

To this end, the chip cascade ports CP1 to CPn are in signal/data communication/connection with the respective antenna ports P1 to Pn, via the bypass channel(s) BP and via the splitter/combiner module S/C which splits or combines the signals of each respective antenna port (e.g. P1) in between the corresponding chip cascade port (e.g. CP1), and one or more beamforming channels which are used for transmission or reception of one or more beams by the beamforming chip BF-CHIP(1,1) itself (e.g. BF1 and possibly in some embodiments additional beamforming channels which may be included in the illustrated BFSets 2 to L).

It should be understood that the phrase splitter/combiner module S/C, which is also referred to herein as a network of splitters or combiners S/C, is used herein to encompass any one of an arrangement of one or more signal/data splitters, and/or an arrangement of one or more signal/data combiners. Specifically as indicated above the beamforming chip/circuit e.g. BF-CHIP(1,1), according to the present invention may be configured and operable for operation in reception mode (e.g. as illustrated in the non-limiting examples of FIG. 3) and/or in transmission mode (e.g. as illustrated in the non-limiting examples of FIG. 4).

More specifically, in the reception mode configuration the splitter/combiner module S/C generally includes an arrangement of signal splitters (and may not include any signal combiners), whereby a signal splitter is configured and operable for splitting a signal from one side thereof, i.e. a signal received from the antenna port side, in to two or more duplicates/replicas at the other side of the signal splitter, such that:
  (a) at least one duplicate/replica of the signal is directed to a bypass channel BP and thereby to a respective cascade port, by which it can be forwarded to additional beamforming chip/circuits (e.g. to BF-CHIP(2,1) and optionally further forwarded to BF-CHIP(k,1)); and
  (b) another one or more duplicates directed to one or more of the beamforming channels BFs of the specific beamforming chip/circuit BF-CHIP(1,1), by which proper delays/phase shifts are applied in order to produce one or more respective beams in the receiving mode operation.

In the transmission mode configuration the splitter/combiner module S/C may include an arrangement of signal combiners (and may not include any signal splitters), whereby a signal combiner is associated with a certain antenna port of the BF-CHIP(1,1) and is configured and operable for combining the signals received from one side thereof obtained from:
  (a) signals obtained from one or more of the beamforming channels BFs of specific beamforming chip/circuit BF-CHIP(1,1) which are associated with that certain antenna port;
  (b) signals obtained via the bypass channel BP and the respective cascade port, from corresponding antenna port of additional beamforming chip/circuits (e.g. to BF-CHIP(2,1) to BF-CHIP(k,1));
whereby, from the other side, the signal combiner outputs a signal combined from the above indicated (a) and (b), and is then forwarded for transmission by the respective antenna port/element, for forming (together with the transmissions of other antenna elements), one or more transmitted beams.

As also indicated above, in some embodiments the signal splitter/combiner module S/C is configured as a network of fixed signals splitters (in reception configuration) or fixed signal combiners (in transmission configuration), arranged such that each one or more of the beamforming channels in the module BFS are fixedly associated/connected to certain antenna element/port (in FIG. 2A, the beamforming channels BFn and BFz are both shown to be connected to the antenna port Pn (antenna element AEn), such that such one or more of the beamforming channels are statically-allocated for forming respective one or more beams by signals transmitted or received via the antenna element they are connected to (in non-pool-wise configuration of the beamforming channels in the chips). Alternatively, in some embodiments the beamforming channels in the beamforming chip/circuit are arranged in a pool, and can be dynamically allocated to antenna ports. In this case the signal splitter/combiner module S/C is configured as a network of controllable signals splitters (in reception configuration) or controllable signal combiners (in transmission configuration), configured to allow controllable connection/allocation of one or more beamforming channels to antenna elements/ports.

Each beamforming channel, e.g. BF1, of the beamforming channels of the BF-CHIP(1,1) may be used for delaying, amplifying and/or phase shifting the signals of the antenna port, e.g. P1 to which it is connected, whereby such delayed/amplified/phase-shifted signal, when combined with properly similarly processed signals of other antenna elements, produces a beam associated with a certain direction of propagation (as would readily be appreciated by those versed in the art—here the term combined refers to free space combination of the antenna waveforms in transmission mode operation, or to electronic/wired combination in reception mode operation). Thus connecting a plurality of beamforming channels BF1 and BFz to a certain antenna element provides for transmitting or receiving the components of a respective plurality of beams via that antenna element.

Indeed, the number of beamforming channels of the beamforming chip BF-CHIP(1,1) which can be connected to each antenna element, may generally limited (e.g. by the total number of beamforming channels BFs in the beamforming chip BF-CHIP(1,1) and/or by a limitation on the number beams imposed by limited data capacity of the bus connection Bus-I/O or of the data bus BUS1 for communicating the data of the beams) However, according to the technique of the present invention, the signals of the antenna elements that are connected to the beamforming chip BF-CHIP(1,1) may be adjusted to produce additional beams, on top of the one or more beams that are produced by the beamforming chip BF-CHIP(1,1). This is achieved by the vertical connection of the additional beamforming chips, e.g. BF-CHIP(2,1) to BF-CHIP(k,1) to the BF-CHIP(1,1).

To this end, as illustrated in FIGS. 2A and 2B, the present invention provides a novel antenna system 10 including a plurality of antenna elements arranged in an antenna array ANT (or connections/ports to such antenna elements). The plurality of antenna elements of the antenna array ANT are divided/associated—with a plurality of subsets SBSET1 to SBSETm and the antenna system 10 includes per each subset of one or more antenna elements SBSET1 to SBSETm, a respective vertical cascade VC1 to VCm of one or more beamforming circuits BF-CHIP(1,1) to BF-CHIP(k,m). e.g. one or more beamforming circuits BF-CHIP(1,1) to BF-CHIP(k,1) are arranged/connected in vertical cascade VC1 and adapted for connecting to antenna elements of subset SBSET1 for forming multiple beams by the signals of those antenna elements. Other ones of the vertical cascades VC1 to VCm are generally configured similarly, although the number of vertically connected beamforming circuits may be different in different vertical cascades. Each vertical cascade, e.g. VC1, is in turn connected directly, or indirectly via RF frontend module(s) FRE(s), to the one or more antenna elements of the subset, for at least one of transmitting and receiving signals thereby.

It should be noted that, typically, the feeding ports of the antenna elements are analog ports. Accordingly, in case the vertical paths in the vertical cascades are digital paths (i.e. in case the antenna ports and the cascade ports of the beamforming circuits/chips are digital), the system 10 includes a digital/analog conversion module between the antenna elements and the beamforming circuits. To this end, in such embodiments the RFE modules or the antenna ports of the beamforming circuits BF-CHIP(1,1) at the top level (closest to the antenna) may include ADC/DAC for converting between the analog signal form at the antenna ports and digital signal form at the vertical cascade paths (ADC in reception path configuration and DAC in transmission path configuration).

In some implementations the vertical cascade, e.g. VC1, of the beamforming chips is connected indirectly to the one or more antenna elements of the respective subset, e.g. SBSET1, via an RF frontend module of the antenna system, such that the antenna I/O module ANT-I/O of a first one of the beamforming chips, e.g. BF-CHIP(1,1) of the vertical cascade VC1 is connected to the RF frontend module FRE which is in turn is connected to RF feeding ports of the antenna elements of the subset SBSET1. It is understood that the antenna system may include one RF front-end module FRE connected to all antenna elements, or a plurality of FREs serving different antenna elements (whereby there may or may not be one-to-one correspondence between the RFEs and the vertical cascades).

FIG. 2B shows an example wherein the subsets SBSET1-SBSET4 of antenna elements are arranged/in respective separate physical panels PNL1 to PNL4 antenna whose antenna elements are connected to respective vertical cascades, VC1 to VC4 whereby in this non-limiting example the connection is made via respective RF-front-end module RFE. Accordingly, in this example, each panel with its respective vertical cascade and the optional RF-frontend module is implemented as a physically separated building block of a multibeam antenna array, whereby the number for beams handled by the antenna array may be increased or decreased by adding or removing beamforming circuits/chips to the vertical cascades, and the number of antenna elements used for transmission or reception of beams may be increased or decreased by adding/removing panels to the system 10 and accordingly horizontally connecting them to the data buses, e.g. to BUS1 and BUS2, as shown. e.g. each beamforming chip/circuit of a respective vertical cascade is horizontally connected via a data bus to at least one other beam forming chip/circuit of another vertical cascade.

Referring back generally to FIGS. 2A and 2B, it is noted that the horizontal connection in between beam forming chips/circuits of different vertical cascades is carried out by data-bus(s), e.g. BUS1, BUS2, which carry/communicate, to or from the corresponding beamforming circuits of different vertical cascades, the data of the beams, that are respectively transmitted or received by the system 10.

Figure 5:
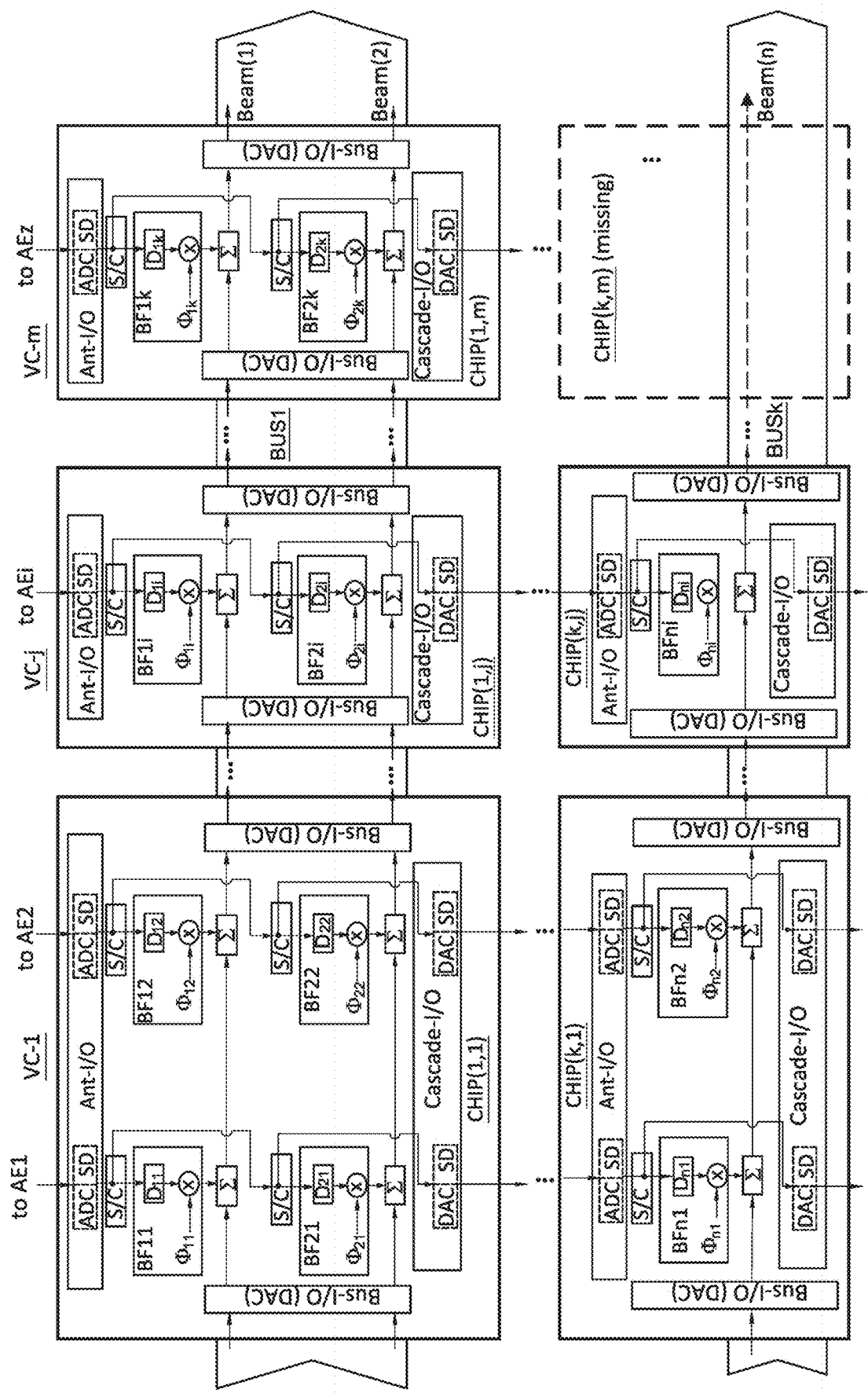
FIG. 5 illustrates, in a block diagram, a scalable beam forming system including an analog data bus and a plurality of beam forming circuits configured according to an embodiment of the present invention for reception of multiple beams.
Figure 6:
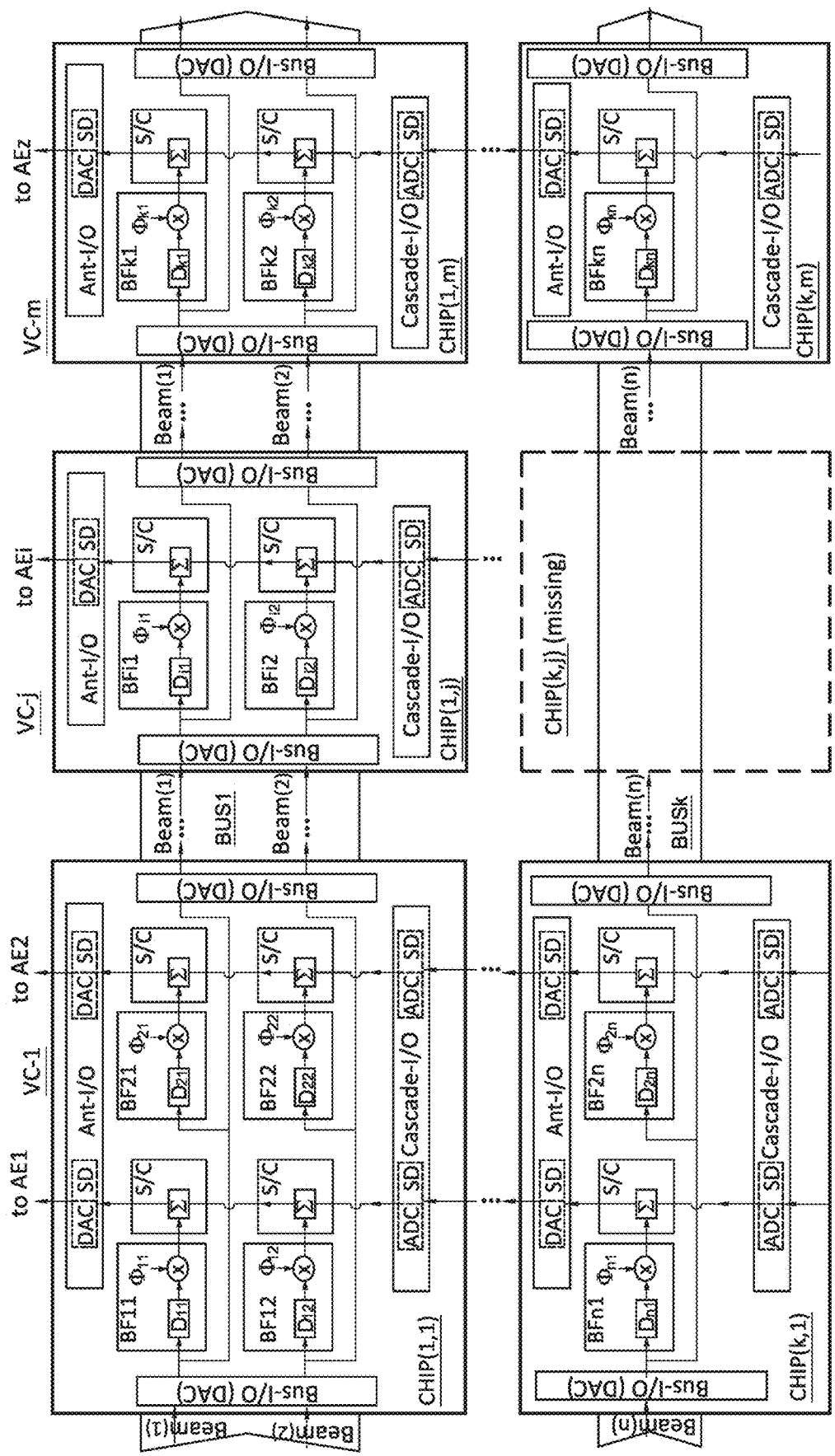
FIG. 6 illustrates, in a block diagram, a scalable beam forming system including an analog data bus and a plurality of beam forming circuits configured according to an embodiment of the present invention for transmission of multiple beams.

The data-bus(s), e.g. BUS1, BUS2, may be digital buses, as in the embodiments of FIGS. 3 and 4, and/or analog buses, as in the embodiments of FIGS. 5 and 6.

In embodiments where the data-bus, e.g. BUS1, BUS2, is digital, the data bus connection BUS-I/O typically includes a digital interface configured and operable for connecting and communicating with the bus. In this regard it should be noted that the term "digital interface" is used in the present disclosure to designate any suitable type of interface capable of connecting/communicating with a digital bus, and may for example include: a parallel interface or serial interface, optionally but not necessarily including serial to parallel and parallel to serial conversion (SerDes). The digital interface may be differential or single ended. The digital interface may be adapted to operate with any one or more of various voltage levels (CMOS, LVDS, CML, etc.) and may include a clock signal or not. To this end in some embodiments where the data-bus, e.g. BUS1, BUS2, is operable for serial communication, and the data bus connection BUS-I/O optionally includes a serializer-deserializer module (SerDes) configured and operable for decoding and/or encoding signals from/to the data-bus (e.g. decoding by reserializing the serialized signals from the bus, and encoding by serializing signals for communication through the bus).

In embodiments where the data-bus, e.g. BUS1, BUS2, is analog, the data bus connection BUS-I/O may include one or more convertors between digital and analog for decoding and/or encoding signals on the bus. More specifically, in transmission mode configuration, at least an ADC is used for decoding analog signals from the bus and converting them to digital form. In reception configuration, at least a DAC is used for encoding signals on the bus. In some implementations, in the reception configuration also ADC is used for first decoding of the signals already communicated through the bus, then those decoded bus signals are combined or multiplexed with the signals of the beamforming circuit which should be communicated through the bus and the combined signals are encoded on the bus by the DAC.

For instance in transmission mode the data of beam, Beam(1), which is to be transmitted (and optionally of more beams, e.g. Beams(2 to L) depending on the beamforming capacity of the beamforming circuits), is communicated by the data-bus BUS1 to all the corresponding beamforming circuits/chips of the different vertical cascades VC1 to VCm of the system (e.g. to BF-CHIP(1,1) to BF-CHIP(1,*m*)). The corresponding beamforming circuits/chips BF-CHIP(1,1) to BF-CHIP(1,*m*)) are in turn operated, to apply the beamforming to the data of those beams, e.g. Beam(1) and optionally beams Beams(2 to L), for collectively transmitting the beams by the antenna elements that are associated with the vertical cascades of the beamforming circuits/chips BF-CHIP(1,1) to BF-CHIP(1,*m*)).

In this regard, the data of each beam, e.g. Beam(1) in the data bus, e.g. BUS1, may include a stream of samples/symbols representing the data which should be encoded in the beam Beam(1) and data indicative of the direction to which the respective beam, e.g. Beam(1), should be transmitted. This data of the beam Beam(1) is read/decoded/extracted from the data-bus by the data-bus connection Bus-I/O and communicated to each of the beamforming channels BF1 to BF*n*.

In this example, the beamforming of Beam(1) is implemented by the beamforming channels BF1 to BF*n* (indicated to herein as BFSet-1 of the beamforming chips BF-CHIP(1,1) to BF-CHIP(1,*m*)). These beamforming channels are operated for introducing proper time shifts (i.e. delays) and/or phase shifts (and optionally also gain adjustment (for tapering)), to the data streams/signals (e.g. stream of symbols) of the respective beam, Beam(1), wherein the magnitude of the time delay and/or phase-shift which is introduced by each specific beamforming channel e.g. BF2 is adjusted based on the direction of the beam Beam(1) and the location in the array ANT of the antenna element e.g. AE2 that is connected to the specific beamforming channel e.g. BF2 for transmitting the beam Beam(1) according to any suitable beamforming technique as may be known in the art.

For instance, the beamforming channels may be configured and operable for introducing phase shift and/or gain to the carrier band of the signal which is to be transmitted by the respective antenna element, and/or possibly also introducing true time delay TTD to the baseband of the signal which is to be transmitted so as to allow accurate beamforming of data carrying signals over large antenna arrays. As generally known, the time delays and/or phase shifts are selected such that the signals of the beam Beam(1) transmitted from all the antenna elements participating in transmission of the data of that beam Beam(1), constructively interfere during their free space propagation in the respective direction of the beam Beam(1). In this connection it is noted that beamforming performed in the carrier band (e.g. RF) may be implemented equivalently by introducing phase shift or time delay. Beamforming performed on the signals of frequency lower than the carrier band (e.g. baseband or intermediate frequency (IF)) may also be implemented by introduction of phase shifts, however greater beamforming accuracy can be obtained by using TTD (that is introduction of both time delay and phase shift). Furthermore, the beamforming channels may also be configured and operable for implementing tapering by introducing (real) gain adjustment to the signals, of different antenna elements in order to manipulate the antenna pattern. This may be used for instance in order to further shape the beam and/or reduce side-lobes. The beamforming channels BFs may be configured and operable according to any known in the art technique of performing carrier band beamforming, in which only the phase of the carrier frequency is shifted to produce the constructive interference of the carrier component of the transmitted signal in the desired direction, and/or for performing true time delay beamforming which also includes temporally delaying the data streams themselves (i.e. the baseband of the transmitted signals; e.g. via true time delay scheme TTD) so that accurate beamforming of transmitted data encoded beams can be achieved over large antenna arrays (e.g. the characteristic widths (D) of which may exceed a given threshold determined by the signal bandwidth (B) and the required scan (squint) angle θ of the antenna array, such that $2BD \sin \theta/c \ll 1$, where c denotes the speed of the electromagnetic wave). In the same way also the additional beams Beams(2 to L) whose data is communicated via the data bus BUS1, can be transmitted, as long as the beamforming chips that are connected to that data-bus, BUS1, have enough beam former channels BFS for transmitting all those beams, and the data rate of their data connection Bus-I/O with the bus BUS is sufficient for receiving the data of the beams Beams(2 to L). In this specific example, optional additional beamforming channels are shown illustratively grouped in BFSets 2 to L for forming up to L beams by the beamforming chip.

In case the limitations of certain beamforming chips, e.g. BF-CHIP(1,1) to BF-CHIP(1,*m*) of the different respective vertical cascades VC1 to VCm are exhausted by the transmission of the beams 1 to L (e.g. of Beam(1) and possibly Beams(2 to L)), the transmission of additional beam(s), Add-Beam or Add-Beams, may be possible by beamforming chips of a different level in the vertical cascade, e.g. by BF-CHIP(k,1) to BF-CHIP(k,m) in FIG. 2A, or by BF-CHIP (2,1) to BF-CHIP(2,4) in FIG. 2B, which may be connected to the same or to different data bus (e.g. as shown connected to data-bus BUSk and BUS2 in FIGS. 2A and 2B respectively) for receiving the data of the additional beams.

To this end, in some embodiments of the present invention, the antenna system 10 includes the vertical cascades VC1 to VCm of beamforming circuits/chips whereby each vertical cascade is associated with the respective subset SBSET1 to SBSETm of antenna elements, and each includes two or more beamforming chips arranged in two or more respective vertical levels (e.g. levels 1 to k in FIG. 2A). In some embodiments, two or more data buses, e.g. data-buses BUS1 to BUSk, are used to implement respective horizontal connection in between beam forming chips of different levels, 1 to k, in the different vertical cascades. Each data bus provides horizontal connections between corresponding beamforming chips (e.g. of the same level) in different vertical cascades. It should be noted however that it is not necessary that each data bus is dedicated for connecting the beamforming chips of only one level in the vertical cascades, and in some embodiments a certain data-bus may be used for horizontally connecting beamforming chips of a plurality of levels in the vertical cascades (this is mainly dependent on the data-rate capacity of the data-bus). It should be understood that the arrangement of beamforming chips in respective levels in the vertical cascades is not limited to transmission operation/configuration of the system, and may similarly be implemented in the same way also in reception operation/configuration.

In the configuration and operation of the system for operating reception mode, the data of each beam being received, e.g. Beam(1), is produced by the beamforming chips and communicated via one of the data-buses. A beam, e.g. Beam(1) may be collectively received by the antenna elements of one, or more generally of a plurality, of the subsets of the antenna elements SBSET1-SBSETm which are associated by the respective vertical cascades VC1 to VCm of beamforming circuits/chips. Considering for example the case where beamforming chips of vertical level 1 in the vertical cascades VC1 to VCm, i.e. beamforming circuits/chips BF-CHIP(1,1) to BF-CHIP(1,m), should be operated for forming the received beam Beam(1) from the signals received by the antenna elements of the respective subsets SBSET1 to SBSETm. Beamforming of the received beam Beam(1) is implemented by the beamforming channels BFs of the beamforming chips BF-CHIP(1,1) to BF-CHIP(1,m)) which are operated for introducing proper time delays and optionally also gains and/or phase shifts to the signals (analog or digital) obtained from the antenna elements of the respective subsets SBSET1 to SBSETm. The data-bus, e.g. BUS1, may generally provide data indicative of the respective direction from which the received beam Beam(1) should be formed.

Accordingly, in order to form the received beam Beam(1), the certain beamforming channels BFs of the beamforming chips BF-CHIP(1,1) to BF-CHIP(1,m)) are operated for introducing time delay, gain and/or phase-shift to the signals of the different antenna elements whereby the magnitude of the time delay, gain and/or phase-shift introduced by each of the certain beamforming channels e.g. BF2 is adjusted according to any suitable beamforming technique (e.g. TTD employed on the baseband) based on the direction of the beam Beam(1) and the location in the array ANT of the antenna element e.g. AE2 that is connected to the specific beamforming channel e.g. BF2 for receiving the beam Beam(1)). As generally known, the time delays and/or phase shifts are selected such that signals/data-streams received by the antenna elements from the particular direction of the beam Beam(1) are added constructively, while signals from other directions are substantially suppressed. This may be performed by configuring the beamforming channels, e.g. BF2, to perform any suitable beamforming technique, such as carrier band beamforming, in which the phase of the carrier frequency of the received signals by the different antenna elements are shifted in order to allow the constructive additions of the carrier component of the signals received by the different antenna elements from the desired direction of the beam Beam(1), or true time delay beamforming, in which in addition to phase shift of the carrier, also temporally delaying the data streams themselves (i.e. the baseband of the received signals; e.g. via true time delay modules/scheme TTD) so that accurate beamforming of received, data encoded, beams can be achieved over large antenna arrays (e.g. whose characteristic widths exceed $c/2B \sin\theta$ where B is the signal bandwidth and c is the speed of the electromagnetic wave). Thus, after proper phase shifts and/or time delays are introduced to the signals of the different antenna elements, the signals are combined (e.g. on the data-bus e.g. BUS1), to communicate therethrough therein the data-stream of the beam Beam(1) that has been received from its respective direction.

It is noted that the bus-connection module Bus-I/O of the beamforming chip may be configured and operable for combining together signals of the beamformers of the beamforming chip, e.g. BF1 to BFn of BF-CHIP(1,1) (indicated as BFSet-1), which are used for receiving the same beam, e.g. Beam(1), and also combining the same, with the signals/data-stream of this beam which are formed in the data-bus BUS1 by other beamforming chips (e.g. BF-CHIP(1,2) to BF-CHIP(1,m) of the system 10 to thereby enable reception of the beam Beam(1) by an additional or all antenna elements of the system 10. In the same way, also the additional beams Beams(2 to L), can be beamformed by the beamforming channels associated with BFSets 1 to L respectively) and written/encoded on the data-bus, BUS1 (this is as long as the beamforming chips connected to that data-bus have enough beam former channels BFS for forming those beams, and the data rate of their data connection Bus-I/O with the bus BUS1 is sufficient for communicating/writing/encoding the data of the beams Beams(2 to L) on the data-bus.

In case the limitations of certain beamforming chips, e.g. BF-CHIP(1,1) to BF-CHIP(1,m) of the different respective vertical cascades VC1 to VCm are exhausted by the reception of the beams 1 to L (e.g. of Beam(1) and possibly Beams(2 to L)), the reception of additional beam(s), Add-Beam or Add-Beams, may be possible by beamforming chips of a different level in the vertical cascade, e.g. by BF-CHIP(k,1) to BF-CHIP(k,m) in FIG. 2A, or by BF-CHIP (2,1) to BF-CHIP(2,4) in FIG. 2B, which may be connected to the same or to a different data bus (e.g. as shown connected to data-bus BUSk and BUS2 in FIGS. 2A and 2B respectively) for receiving the data of the additional beams.

It should be noted that optionally the beamforming circuit/chip, e.g. BF-CHIP(1,1), of the present invention may be configured and operable for supporting transmission or reception of only one beam, or of several beams. The groups BFSet1 and optional BFSets 2 to L of the beamformer channels BF1 to BFz in the beamforming chip BF-CHIP(1, 1) may be statically grouped for the formation of respective beams, or may be, in some implementations, dynamically grouped—for/associated—with the formation of respective beams. In the latter case, where the beamforming circuit/ chip BF-CHIP(1,1) is configured to enable dynamic/controllable grouping/association of beamforming channels BF1 to BFz to beams, the association may be achieved by the connection of the beamformer channels of the groups to the antenna elements (e.g. via the splitter/combiner module S/C).

The BF-CHIP(1,1), e.g. the splitter/combiner module S/C, is configured and operable to direct the data of the respective beam, e.g. Beam(1) between the beamforming channels, e.g. of BFSet1, participating in that beam formation and the data bus BUS1. In transmission, such directing of the beam's data is obtained by operation of the bus-connection Bus-I/O which is configured for decoding the data of the respective beam, e.g. Beam(1), from the data-bus, BUS1 and diversion/routing (e.g. via splitter/combiner module S/C) to the beam former channels of the respective set BFSet1. In reception mode, configuration signals of the beam former channels of the respective set BFSet1 allocated for Beam(1) are combined by splitter/combiner module S/C and directed to the bus-connection Bus-I/O, which is configured and operable in this case for accumulating/summing/adding the signals of the respective beam e.g. Beam(1) to a data stream of that beam Beam(1) that is communicated through the data-bus BUS1 (e.g. in the reception mode the data stream of the beam Beam(1) on the data-bus BUS1 may include the signals of Beam(1) as obtained from BF-CHIP(1,1) as well as the signals of that beam obtained from beamforming circuits of other vertical cascades that participate in the reception of that beam Beam(1); typically the beam's data stream presents a summation of the signals of the beam which are obtained by the beamforming circuits of a plurality of vertical cascades).

To this end, as shown specifically with regard to BFSet1, the data of a certain beam, Beam(1), is communicated by the bus-connection Bus-I/O in between the bus BUS1 to the beamformer channels BF1 to BFn of the set BFSet1, while the latter are connected (e.g. via the optional splitter/combiner module S/C) to respective antenna ports P1 to Pn associated with antenna elements of subset SBSET1 (being the subset of antenna elements connected to the vertical cascade VC1 to which the respective beamforming circuit/chip BF-CHIP(1,1) belongs). To this end, in such an implementation, in which the association between the beam former channels BF1 to BFz of the chips to different beams and the antenna elements is adjustable, the beam former channels BF1 to BFz are actually arranged in a pool, and the selection of the number of beams to be formed by the system, and which antenna elements should participate in the formation of each beam, can be controlled dynamically. Accordingly, in such an implementation, there may be flexibility in the number of beams handled (transmitted or received) by the system, as some beams may be transmitted or received by all the antenna elements (e.g. in case accurate beamforming with improved directionality/reduced beam width and/or reduced side-lobes is desired), while other beams may be transmitted or received by only some of the antenna elements (e.g. by each second or third antenna elements in case side lobe effects are less critical, or may be transmitted/received by antenna elements of a certain sub-region of the antenna ANT, in case the accuracy of the directionality of the main beam, such as its widths and/or focusing properties, are less important). Accordingly, beam former channels which are "saved" from participating in the formation of one or more beams (e.g. on the expense of those beams' directionality and/or side-lobes), may be used for forming additional beams.

Thus, the present invention provides a novel beam forming circuit 100, illustrated in more detail with reference to BF-CHIP(1,1) which is configured and operable for being incorporated in an antenna system 10, such as a phased array antenna, for providing/improving the scalability of the antenna system in terms of the number of beams which can be transmitted or received thereby.

As will be clear from the description below, in various embodiments of the present invention the beam forming circuit BF-CHIP(1,1) is implemented/configured for operating in reception mode, or in transmission mode, or to enable in either reception and transmission modes, or both concurrently, or sequentially. The beam forming circuit BF-CHIP(1,1) includes:

an antenna I/O module Ant-I/O for connecting directly or indirectly to a plurality of antenna elements of an antenna system. The antenna I/O module Ant-I/O may include a plurality of antenna ports respectively connecting to the antenna elements.

a data bus connection Bus-I/O, for connecting the beamforming circuit BF-CHIP(1,1) to the data-bus, e.g. BUS1, which is adapted to communicated data indicative of at least one beam Beam(1). In some implementations the beamforming circuit BF-CHIP(1,1) may be adapted for connecting to a digital data-bus, e.g. BUS1, and accordingly the data bus connection Bus-I/O typically includes a digital interface whereby the latter may optionally include a data encoder/multiplexer and/or data decoder/demultiplexer (e.g. a serializer-deserializer (SERDES) module) adapted for communicating the at least one beam's, Beam(1), signals with the digital data-bus BUS1 with the data-bus BUS1. Alternatively or additionally, in some implementations the beamforming circuit BF-CHIP(1,1) may be adapted for connecting to an analog data-bus, BUS1, and accordingly, in such embodiments, the data bus connection Bus-I/O may include an analog to digital converter (ADC) connected to the analog bus for decoding the data stream that is communicated through the bus in analog form and convert it to digital representation for processing by the beamforming circuit, and a digital to analog converter (DAC) connected to the analog bus for converting the data stream data, possibly after being somewhat processed by the beamforming chip, back to analog form for communication through the analog data-bus, BUS1, to possibly additional beamforming circuits which may be horizontally connected with the instant beamforming circuit BF-CHIP(1,1) through the bus;

a beam forming module BFs including a plurality of beam forming channels BF1 to BFz connectable in between the data bus connection Bus-I/O and the antenna I/O module Ant-I/O (e.g. its antenna ports P1 to Pn) and adapted to process signals communicated between the data bus connection Bus-I/O and the antenna ports P1 to Pn for introducing controllable shifts (time delays and/or phase shifts) to the processed signals, in order to beamform the processed signals and thereby form one or more beams by those signals as they are being received or transmitted by respective antenna elements AE1 to AEn of the antenna system 10 which are connected to the beam forming circuit BF-CHIP(1,1).

According to the present invention, the beam forming circuit also includes a cascade I/O module Cascade-I/O which includes plurality of cascade ports CP1 to CPn. Within the beam forming circuit BF-CHIP(1,1), the cascade ports CP1 to CPn are connected to the plurality of antenna ports P1 to Pn respectively via a plurality of corresponding bypass channels BP, such that each antenna port, e.g. P1 is connectable, in parallel, to at least one respective bypass channel, and to one or more of said beamforming channels via a signal splitter/combiner S/C. The signal splitter/combiner S/C is configured and operable for at least one of the following:

> In transmission mode/configuration of the beam forming circuit BF-CHIP(1,1): combining signals (e.g. by summation) of the respective bypass channel (e.g. that connected to cascade port CP1) and the one or more beamforming channels (e.g. BF1) associated with the respective antenna port (e.g. P1), to form a combined signal at that antenna port; and
>
> In reception mode/configuration of the beam forming circuit BF-CHIP(1,1): splitting the signal of the respective antenna port, (e.g. P1), to form duplicates thereof at the respective bypass channel (e.g. that connected to cascade port CP1) and the one or more beamforming channels (e.g. BF1) associated with the respective antenna port.

Accordingly, as with the above configuration, the cascade I/O module Cascade-I/O, actually bypasses through the beamforming circuit BF-CHIP(1,1) and thereby enables to connect to the beam forming circuit BF-CHIP(1,1), one or more additional beam forming circuits, e.g. BF-CHIP(2,1) to BF-CHIP(k,1), in a vertical cascade VC1, for forming, by the beam forming modules of the one or more additional beam forming circuits BF-CHIP(2,1) to BF-CHIP(k,1), one or more additional beams Add-Beams, which can be transmitted or received by the antenna elements AE1 to AEn to which the beam forming circuit BF-CHIP(1,1) is connected. This is without a need for connection of the one or more additional beam forming circuits, e.g. BF-CHIP(2,1) to BF-CHIP(k,1), directly to those antenna elements and without requiring multiple RF ports for in those antenna elements.

Reception Mode Configuration of the Beamforming Circuits

To this end, considering more specifically the embodiment where the beam forming circuit BF-CHIP(1,1) shown in FIG. 2A is specifically configured for operation in reception mode, the following configuration of the beam forming circuit BF-CHIP(1,1) is noted:

> The plurality of antenna ports P1 to Pn of the antenna I/O module Ant-I/O, which are used for connecting to the antenna elements of the array ANT, may optionally include analog to digital converters that are configured and operable for converting analog signals obtained from the antenna elements to digital representation at which those signals are processed by the beamforming circuit BF-CHIP(1,1) (considering the reception configuration, the convertors between digital and analog AD in FIG. 2A indicate analog to digital converters in reception configuration, and vice versa digital to analog converters in transmission configuration). Alternatively or additionally, the plurality of antenna ports P1 to Pn of the antenna I/O module Ant-I/O, which are used for connecting to the antenna elements of the array ANT, may optionally be implemented as digital ports. In that case optionally the antenna I/O module Ant-I/O typically include a digital interface SD (e.g. a serial or parallel one). Optionally, digital interface in that case may include a serializer-deserializer (SerDes) module implementing a Serial-to-Parallel conversion so that serial/serialized digital signals received through the antenna port are converted to parallel signals within the beamforming circuit BF-CHIP(1,1). Optionally, alternatively or additionally, the SerDes may implement Parallel-to-Serial conversion, in case parallel signals are received through the antenna port and processed in serial form by the chip/circuit. It should be noted that the SerDes may be obviated in digital implementation, where the same parallel or serial form is used for both the processing of the signals within the beam forming circuit, and their communication between beam forming circuits of the cascade, or from the antenna.
>
> In this case, the signal splitter/combiner module S/C generally includes a plurality of signal splitters connectable to the antenna ports P1 to Pn, wherein each signal splitter is adapted to splitting the signals received by an antenna port connected thereto to form at least two replicas (duplicates);
>
> The beam forming channels BF1 to BFz of the beam forming module BFS are each e.g. BFn, being connectable (e.g. statically connected, or dynamically/controllably connected in case the beamforming channels are in a "pool") to at least one of the antenna ports, e.g. Pn, of the antenna ports P1 to Pn via at least one signal splitter of the signal splitter/combiner S/C, such that the beam forming channel e.g. BFn, receives a duplicate/replica signal of the signal of the antenna port. Such a beam forming channel e.g. BFn, is configured and operable for processing the signal received from the antenna port e.g. Pn for introducing thereto a controllable shift, being at least one of a time delay, gain and phase shift. Accordingly beamforming of signals received by the antenna elements is enabled.
>
> The data bus connection Bus-I/O, which is connected to the beamforming module BFS and connectable to a data-bus, e.g. BUS1 is configured and operable for receiving the controllably shifted signals from the beam forming channels of the beamforming module BFS and encoding the controllably shifted signals on the data-bus, BUS-1, such that data of at least one beam is formed and communicated through said data-bus; and
>
> The cascade I/O module includes a plurality of cascade ports, CP1 to CPn which are respectively connected through corresponding bypass channels and via respective signal splitters of the signal splitter combiner S/C to the plurality of antenna ports P1 to Pn. Connection of the cascade ports, CP1 to CPn to the antenna ports P1 to Pn via the signal splitters is made such that each cascade port, e.g. CPn obtains a replica of the signals received by the respective antenna port Pn to which it is connected.
>
> In the reception mode, the cascade ports may optionally include digital to analog converters (DACs) configured and operable for converting signals received in digital from the bypass channels for output in analog form via the cascade ports CP1 to CPn (considering the reception configuration, the elements depicted DA in FIG. 2A indicate such digital to analog converters and vice versa in transmission configuration). Alternatively or additionally, the cascade ports, which are used for connecting to the beamforming chips in a cascade, may optionally be implemented as digital ports. In that case optionally the cascade I/O module may include a digital interface SD (e.g. a parallel or serial one). Optionally, the digital interface SD may include a serializer-deserializer (SerDes) module implementing a Parallel-to-Serial conversion so that parallel digital signals of the cascade ports in the beamforming circuit BF-CHIP(1,1) are serialized for communication to the next chip in the cascade. Optionally, alternatively or additionally, the SerDes may implement a Serial-to-Parallel conversion in case the signals are processed in serial form by the chip/circuit and are to be communicated in parallel form between beam forming circuits in the cascade. BF-CHIP(1,1) are serialized to for communication to the next chip in the cascade. It should be noted that the SerDes module may be obviated in digital implementation where the same parallel or serial form is used for both the processing of the signals within the beam forming circuit and their communication between beam forming circuits of the cascade. Thus, in some embodiments of the present invention, the beamforming circuits BF-CHIP(1,1) to BF-CHIP(k,m) of the system 10 are configured and operable in reception mode, as described in detail above. In such embodiments, the system 10 is operable for receiving multiple beams (e.g. data encoded communication beams), from multiple directions, and provides a scalability with respect to the number of beams that can be concurrently received by adding/removing beamforming circuits (e.g. in the form of integrated circuits/chips) to one or more, or to all, of the vertical cascade(s) VC-1 to VC-m of the system 10.

The above features of the reception mode configuration of the system 10 of the present invention and the beamforming circuits BF-CHIP(1,1) to BF-CHIP(k,m) thereof are illustrated in a self-explanatory manner in the non-limiting example shown in FIG. 3.

In the specific non limiting example of FIG. 3, the beamforming circuits BF-CHIP(1,1) to BF-CHIP(k,m) are implemented as Application Specific Integrated Circuit ASIC modules. As shown, optionally, the beamforming circuits BF-CHIP(1,1) to BF-CHIP(k,m) may not be similar in the number of beamforming channels they include. For instance, in this simple example BF-CHIP(1,1) includes only four beamforming channels, while other beamforming circuits (e.g. BF-CHIP(1,*j*), BF-CHIP(1,*m*) and BF-CHIP(k, 1), include only two beamforming channels each. Also as shown, the beamforming circuits BF-CHIP(1,1) to BF-CHIP (k,m) may be different in the maximal number of beams which can be received thereby and/or in the number of the antenna elements they can serve/operate of the reception of such beams (as indicated above, one beamforming channel is required per each beam and antenna element that should participate in reception of a component of such a beam).

Moreover, as also shown, the vertical cascades may be configured with different numbers of beamforming circuits BF-CHIP(1,1) to BF-CHIP(k,m) and may generally be adapted for supporting reception of a different number of beams (e.g. in which case some beams may be received via a reduced number of antenna elements). For instance, here the vertical cascades VC-1 to VC-j support the caption of n beams, while the vertical cascade VC-m does not support the reception of the n$^{th}$ beam.

It should be noted, in this example, that for clarity the beam former channels of the beamforming circuits, e.g. BF11 to BF22 of BF-CHIP(1,1), are shown to be statically/fixedly allocated to antenna elements and beams, such static allocation not being essential, and the beam former channels may be arranged in a "pool" and dynamically allocated to antenna elements and/or to beams, e.g. per demand In such a dynamic configuration, instead of the beam splitters S/C fixedly connected between the beam forming channels BF11 to BF22 and the antenna ports, a network of beam splitters that can dynamically connect the beam forming channels BF11 to BF22, e.g. via controllable switches, to antenna ports, is used, and also the data-bus connection may be configured to enable combining the singles received from each beam forming channel, e.g. BF11 with the data-stream of a selected beam, e.g. Beam(1) on the data-bus.

Thus, per each received beam of interest to be formed by the BF-CHIP(1,1), e.g. Beam(1), a combined beam signal is formed by the BF-CHIP(1,1), which is formed as a combination of the signals of the antenna elements that are associated with the BF-CHIP(1,1), whereby the combination is made with proper shifts (time delays and/or phase shifts introduced by the beamforming channels) that are suitable for forming that respective beam Beam(1) (i.e. in the desired direction and/or with desired focusing properties).

In this non-limiting example, the data-bus BUS1 is implemented as a digital bus. The data bus connection Bus-I/O is configured and operable for encoding data streams of one or more beams received by antenna elements AE1 to AEn of the antenna array ANT, e.g. Beam(1), on the digital bus BUS1. Accordingly, the Bus-I/O in this example includes a digital interface SD capable of encoding/combining the combined signals of each beam Beam(1) with the data-stream associated with that respective beam Beam(1) on the data-bus. For example, the digital interface SD may be configured and operable for decoding the data stream of each beam of interest, e.g. Beam(1), from the bus, adding thereto the combined signal associated with the reception of that beam Beam(1) by the beamforming circuit CHIP(1,1) e.g. thereby forming an updated data stream of that beam, and encoding the updated data stream of that beam back to the data bus.

In this particular example it is shown that the Cascade-I/O optionally includes DACs (e.g. per each cascade port) and the Ant-I/O optionally includes ADCs (e.g. per each antenna port). To this end, as would be readily appreciated by those versed in the art, in the present non-limiting example the signals within the beamforming circuit, e.g. BF-CHIP(1,1) are presented and processed in digital form/representation thereof, and the signals communicated in between different the beamforming circuits of the same vertical cascade, e.g. between BF-CHIP(1,1) to BF-CHIP(k,1) of VC-1, are in analog form. This has the advantage that the splitting of the signals (via the signal splitters S/C) of the beamforming circuits of the same vertical cascade, is made digitally, i.e. via digital signal splitters, thus with reduced losses and/or reduced noise introduction to the split signals, as compared to a case where such signals would have been split in their analog representation.

Alternatively or additionally, as indicated above, the cascade ports CP1 to CPn of the Cascade-I/O and the antenna ports P1 to Pn of the antenna I/O module Ant-I/O, may also be implemented as digital ports. Typically, in that case, the antenna I/O module Ant-I/O and the cascade I/O module Cascade-I/O include a digital interface SD implementing the digital cascade ports CP1 to CPn and the digital antenna ports P1 to Pn. In the figure, for clarity, the digital interface SD is shown per each port, however, as will readily be understood by those versed in the art, one digital interface SD of the antenna I/O module Ant-I/O may typically implement the plurality of antenna ports P1 to Pn, or all of them, and one digital interface SD of the cascade I/O module Cascade-I/O may typically implement the plurality of cascade ports CP1 to CPn, or all of them). As indicated above, in some embodiments operating in the reception mode/configuration, the digital interface SD of the antenna I/O module Ant-I/O may include a serializer-deserializer (SerDes) module implementing a Serial-to-Parallel conversion for de-serializing the serialized digital signals arriving from the antenna or from another chip/circuit, and form the parallel signals of the respective antenna ports which are processed by the beamforming chip/circuit. Accordingly, the digital interface SD of the cascade I/O module may also optionally include a SerDes module implementing a Parallel-to-Serial conversion for serializing the parallel digital signals at the cascade ports for communication to the next chip in the cascade.

Also, optionally, as shown in this particular example, the beam forming channels e.g. BF11 to BF22 of BF-CHIP(1,1), are configured and operable for applying beamforming to the baseband of the components of the data beam that are received. To this end, the beamforming channels operate on the baseband (being the frequency band at which the data stream of a beam is encoded in the signals), or on a certain intermediate band in case the sampling rate at which the signal is processed by the beamforming chip is practically higher than the actual baseband, but lower than the carrier frequency band at which the signal is transmitted. Optionally, the beam forming channels are configured and operable for implementing a true time delay (TTD) scheme. In this connection, the implementation of the TTD scheme by beam forming channel BF11 for reception of a component of Beam(1) via antenna element AE1, is considered as an example of such a TTD scheme implementation, and is described in more detail in the following. As would be appreciated by those versed in the art, considering the present disclosure and the configuration of beam forming channel(s) e.g. BF11 in FIG. 3, the beam forming channel(s) e.g. BF11 implement the TTD scheme, by introducing both the following shifts/delays to the signal processed thereby as follows:

(i) The beam forming channel BF11 includes a complex signal multiplier X for multiplying the intermediate band digital representation of the beam component of Beam(1) that has been received from antenna element AE1 by a complex signal selected to introduce the proper phase shift φ11 to the carrier frequency component of Beam(1), so as to account for the relative shift of the phase of the carrier frequency of the signal received by the antenna element AE1 of the antenna array from the direction of Beam(1) due to the of location of that antenna element AE1 in the array. Indeed, typically, the beam component of Beam(1) that is processed at this stage is typically already presented digitally at the baseband/intermediate-band (e.g. with a sampling rate that matches the baseband frequency of the signal at which the data stream is encoded, or presented in a somewhat higher intermediate frequency, which is lower than the Nyquist of the carrier frequency). Accordingly, any higher carrier frequency modulation which is originally included in the received signal, is generally filtered out from the component of the Beam(1) processed at this state (such filtering typically takes place at an RF front-end module associated with the antenna element AE1). However, as would be appreciated by those versed in the art of signal processing, in the phase shift of the carrier, the component of the signal may still be compensated at this stage, during the processing of the base-band/intermediate band signal. This is achieved by the complex signal multiplier X which is operated for multiplying the baseband/intermediate band data encoded signal of Beam(1) by a complex signal φ11 being selected/set according to the desired direction to reception of the Beam(1) and the location, within the antenna array, of the respective antenna AE1. A person of ordinary skill in the art of beamforming will readily appreciate which complex signal should be used, in order to compensate for the carrier's phase shift in a signal arriving from the desired direction of the Beam (1). It should be noted that the complex signal φ11 fed to complex signal multiplier X for multiplying the intermediate/baseband band digital representation of the beam component of Beam(1) may additionally or alternatively be selected to introduce a desired gain (amplitude adjustment) so as to implement beamforming tapering; and (ii) The beam forming channel BF11 also includes a time delay module $D_{11}$ (which may be configured for example by utilizing a digital shift register and/or a delayed re-sampler/interpolator) configured for introducing a selectable time delay to properly phase shift the baseband or intermediate band digital representation of the beam component of Beam(1) that is received from antenna element AE1 and multiplied by the complex signal. The time delay module $D_{11}$ of beam forming channel BF11 is thus operated for introducing, into the intermediate band, digital representation of the beam component of Beam(1), a proper time delay whose magnitude is selected according to the desired reception direction of the Beam(1) and the location, within the antenna array, of the respective antenna AE1 that is connected to beamforming channel BF11 for generating a properly delayed baseband component of Beam(1) which, when combined with the properly time delayed baseband components of Beam(1) received by other antenna elements, forms the received Beam(1) from its respective direction.

Considering the above, it should be noted that the specific technique for TTD scheme implementation according to the present invention is not limited by the above description, and as would readily be appreciated by those versed in the art, the beamforming channels may be configured and operable for implementing TTD schemes by utilizing other suitable TTD techniques.

In embodiments where TTD is not implemented, introduction of only one of the above described phase shifts and/or time delays may be implemented (e.g. one of (i) or (ii) above).

Further, it should be noted that, as known to those versed in the art, different gain may be applied to each of the signals described above, in order to shape the beam as required, e.g. for reducing side-lobes, nulling the beam in unwanted direction, or for similar purposes. As indicated above, each BFC includes phase and delay elements, and possibly gain, as generally known in the art of beam forming (e.g. one or more of these elements may optionally be implemented according proprietary technique described in various patents Application co-assigned to the Applicant of the present Application.

Transmission Mode Configuration of the Beamforming Circuits

Turning back to FIGS. 2A and 2B, in some embodiments the beam forming circuit BF-CHIP(1,1) is specifically configured for operation in transmission mode. In some transmission mode implementations, the following configuration of the beamforming circuit BF-CHIP(1,1) may be implemented:

The data bus connection Bus-I/O may be configured and operable for decoding/extracting from the data-bus BUS1, one or more beams' signals (data streams) of one or more beams, e.g. Beam(1), to be transmitted by antenna elements AE1 to AEn of the antenna array ANT;

The plurality of beam forming channels BF1 to BFn of the beam forming module BFS are connectable to the data bus connection Bus-I/O for receiving the data streams of the one or more beams, e.g. Beam(1). The Bus-I/O in this example includes a digital interface module SD capable of extracting the data content of Beam(1) from the data-bus, which is implemented as a digital bus in this case. The beamforming channels BF1 to BFn are configured and operable for introducing controllable respective shifts, being at least one of respective time delays and respective phase shifts, to the data stream of the beam Beam(1) to thereby form one or more shifted/delayed signals of the beam such that beam Beam(1) is formed upon transmission of the one or more shifted signals by the antenna elements AE1 to AEn of the antenna array ANT;

The beam signal splitter/combiner module S/C includes one or more signal combiners, whereby each signal combiner is connectable from one end thereof to an antenna port, e.g., and from another end thereof to at least one beamforming channel, e.g. BFn and also to at least one cascade port CPn (e.g. via a bypass channel) that is associated said antenna port Pn. To this end, the signal combiner is adapted for combining the signals of the at least one beamforming channel BFn and the at least one cascade port CPn for providing the combined signal to the antenna port Pn. It is understood that in various embodiments the beamforming channels may be statically connected to signal combiners associated with respective antenna ports, or may be dynamically/controllably connected to the signal combiners of the antenna ports (in case the beamforming channels are in a "pool").

The antenna ports P1 to Pn, of the antenna I/O module Ant-I/O may optionally include digital to analog converters (DACs) configured and operable for converting digital signals obtained from the splitter combiner module S/C of the beamforming circuit to corresponding analog signals to be provided to respective antenna elements AE1 to AEn via the antenna ports (considering the transmission configuration, the convertors between digital and analog depicted AD in FIG. 2A indicate such digital to analog converters in transmission configuration and vice versa in reception configuration). Alternatively or additionally, the plurality of antenna ports P1 to Pn of the antenna I/O module Ant-I/O, which are used for connecting to the antenna elements of the array ANT, may optionally be implemented as digital ports. In that case optionally the antenna I/O module Ant-I/O may include digital interface SD (e.g. a parallel or serial interface). Optionally, the digital interface includes a serializer-deserializer (SerDes) module which may implement Parallel-to-Serial conversion, so that parallel digital signals at the antenna ports P1 to Pn of the beamforming circuit BF-CHIP(1,1) are serialized for communication to the antenna (or to the next chip in the cascade which is closer to the antenna). Optionally, alternatively or additionally, the SerDes module may implement Parallel-to-Serial conversion in case the signals are processed in serial form by the chip/circuit and are to be communicated in parallel form between beam-forming circuits in the cascade and/or towards the antenna. It should be noted that the SerDes module may be obviated in digital implementation, where the same parallel or serial form is used for both the processing of the signals within the beam forming circuit and their communication between beam forming circuits of the cascade, or towards the antenna.

The cascade ports CP1 to CPn of the cascade I/O module may include analog to digital converters (ADCs) configured and operable for converting signals received in analog form from antenna ports of another beam forming circuit (e.g. from BF-CHIP(2,1)) into corresponding digital signals that are communicated via the bypass channels BP to the signal combiners of the signal splitter combiner module S/C (considering the transmission configuration, the elements depicted DA in FIG. 2A indicate such analog to digital converters). Alternatively or additionally, the cascade I/O module and the cascade ports CP1 to CPn thereof, which are used for connecting to another beamforming circuit/chip BF-CHIP(1,1) in the cascade, may optionally be implemented as digital ports. In that case the cascade I/O module typically includes a digital interface SD. Optionally, the digital interface SD of the cascade I/O module may include a serializer-deserializer (SerDes) module that implements Serial-to-Parallel conversion, so that serial digital signals communicated between beam forming circuits in the cascade are converted to parallel signals of the different cascade ports for processing within the chip/circuit. Optionally, alternatively or additionally, the SerDes may implement Parallel-to-Serial conversion, in case the signals are processed in serial form by the chip/circuit and are to be communicated between beamforming circuits of the cascade in parallel digital form. It should be noted that the SerDes may be obviated in digital implementation where the same parallel or serial form is used for both the processing of the signals within the beam forming circuit and their communication between beam forming circuits of the cascade.

To this end, in some embodiments of the present invention, the beamforming circuits BF-CHIP(1,1) to BF-CHIP(k,m) of the system 10 are configured and operable in transmission mode, as described in detail above. Such embodiments of system 10 are operable for transmitting multiple beams (e.g. data encoded communication beams), from multiple directions and provide scalability with respect to the number of beams that can be concurrently transmitted by adding/removing beamforming circuits (e.g. in the form of integrated circuits/chips) to one or more, or to all, of the vertical cascade(s) VC-1 to VC-m of the system 10.

The above features of the transmission mode configuration of the system 10 of the present invention and the beamforming circuits BF-CHIP(1,1) to BF-CHIP(k,m) thereof are illustrated in a self-explanatory manner in the non-limiting example shown in FIG. 4.

In the specific non limiting example of FIG. 4, the beamforming circuits BF-CHIP(1,1) to BF-CHIP(k,m) are implemented as Application Specific Integrated Circuit ASIC modules. As shown, optionally, the beamforming circuits BF-CHIP(1,1) to BF-CHIP(k,m) may not be similar in the number of beamforming channels they include. For instance, in this simple example, BF-CHIP(1,1) includes only four beamforming channels, while other beamforming circuits (e.g. BF-CHIP(1,*j*), BF-CHIP(1,*m*) and BF-CHIP(k,1), include only two beamforming channels each. Also, as shown, the beamforming circuits BF-CHIP(1,1) to BF-CHIP(k,m) may be different in the maximal number of beams which can be transmitted thereby, and/or in the number of the antenna elements they can serve/operate of the transmission of such beams (as indicated above, one beamforming channel is required per each beam and antenna element that should participate in transmission of a component of such beam).

Moreover, as also shown, the vertical cascades may be configured with different numbers of beamforming circuits BF-CHIP(1,1) to BF-CHIP(k,m) and may generally be adapted for supporting transmission of a different number of beams (e.g. in which case some beams may be transmitted via a reduced number of antenna elements).

It should be noted that although, in this example, for clarity, the beamforming channels of the beamforming circuits, e.g. BF11 to BF22 of BF-CHIP(1,1), are shown to be statically/fixedly allocated to antenna elements and beams, such static allocation is not essential, and the beamforming channels may be arranged in a "pool" and dynamically allocated to antenna elements and/or to beams, e.g. per demand. In such a dynamic configuration, instead of the beam combiners S/C fixedly connected between the beamforming channels BF11 to BF22 and the antenna ports, a network of beam combiners that can be dynamically connect the beamforming channels BF11 to BF22, e.g. via controllable switches, to antenna ports, is used, and also the data-bus connection may be configured to allow selectable diversion of selected beams (e.g. data streams thereof) to selected beamforming channels BF11 to BF22.

In this particular example it is shown that the Cascade-I/O optionally includes ADCs (e.g. per each cascade port) and the Ant-I/O optionally includes DACs (e.g. per each antenna port). To this end, as would be readily appreciated by those versed in the art, the signals within the beamforming circuit, e.g. BF-CHIP(1,1) are presented and processed in digital form/representation thereof, and the signals communicated in between which are different from the beamforming circuits of the same vertical cascade, e.g. between BF-CHIP(1,1) to BF-CHIP(k,1) of VC-1, are in analog form. This has the advantage that the combining of the signals (via the signal combiners S/C) of the beamforming circuits of the same vertical cascade, is made digitally, i.e. via digital signal combiners, thus with reduced losses and/or reduced noise introduction to the combined signals, as compared to a case where such signals would have been combined in their analog representation.

Alternatively or additionally, as indicated above, the cascade ports CP1 to CPn of the Cascade-I/O and the antenna ports P1 to Pn of the antenna I/O module Ant-I/O, may also be implemented as digital ports and may include digital interfaces SD implementing the digital cascade ports CP1 to CPn and the digital antenna ports P1 to Pn. In the figure, for clarity, digital interfaces SD are shown per each port, however, as will readily be understood by those versed in the art, one digital interface SD of the antenna I/O module Ant-I/O may typically implement the plurality of antenna ports P1 to Pn, or all of them, and one digital interface SD of the cascade I/O module Cascade-I/O may typically implement the plurality of cascade ports CP1 to CPn, or all of them. As indicated above, in the transmission mode/configuration the digital interface SD of the cascade I/O module may optionally include SerDes module implementing a Serial-to-Parallel conversion for de-serializing signals from another chip in the cascade to provide the parallel digital signals of the respective cascade ports. Accordingly, the digital interface SD of the antenna I/O module Ant-I/O may optionally include SerDes module implementing a Parallel-to-Serial conversion for serializing parallel signals of the respective antenna ports for communication towards the antenna or to another chip/circuit.

Also, optionally, as shown in this particular example, the beam forming channels e.g. BF11 to BF22 of BF-CHIP(1,1), are configured and operable for applying beamforming to the baseband of the data beams that should be transmitted. To this end, the beamforming channels operate on the baseband (being the frequency band at which the data stream of a beam is encoded in the signals) or on a certain intermediate band in case the sampling rate at which the signal is processed by the beamforming chip is practically higher than the actual baseband, but lower than the carrier frequency band at which the signal is transmitted. In some embodiments the beamforming channel(s) are configured and operable for implementing a true time delay (TTD) scheme on the baseband or intermediate band signals. In this connection, implementation of the TTD scheme by beamforming channel BF11 for transmission of a component of Beam(1) via antenna element AE1, is for example considered as an example of such a TTD scheme implementation and is described in more detail. As would be appreciated by those versed in the art considering the present disclosure, and the configuration of beamforming channel(s) e.g. BF11 in FIG. 4, the beam forming channel(s) e.g. BF11 implement the TTD scheme, by introducing both of the following shifts to the signal processed thereby, as follows:

(i) The beamforming channel BF11 includes a time delay module D11 (which may be configured for example by utilizing a digital shift register and/or a delayed re-sampler/interpolator) configured for introducing a selectable time delay to the stream of data symbols of Beam(1) (the stream of symbols being that encoding the data content of Beam(1) as obtained from the Bus-I/O (e.g. which is exemplified in this case as a digital interface module SD extracting the data content of Beam(1) from the data-bus that is implemented as a digital bus in this case). The time delay module D11 of beamforming channel BF11 is thus operated for introducing in to the data stream (e.g. the stream of symbols) of Beam(1), a proper time delay whose magnitude is selected according to the desired direction to which the Beam(1) should be transmitted and the location, within the antenna array, of the respective antenna AE1 that is connected to beamforming channel BF11 for transmitting a properly delayed component of Beam(1); and (ii) The beamforming channel BF11 also includes a complex signal multiplier X for multiplying the time delayed data stream of Beam(1) by a complex signal selected to introduce the proper phase shift $\phi 11$ to the carrier frequency component of Beam(1). Indeed, at this stage, the data stream of the beam may be presented digitally with sampling rate that matches the baseband frequency of the signal (at which the data stream is encoded), or presented in a somewhat higher intermediate frequency (any of which may be substantially lower than the Nyquist of the carrier frequency). However, as would be appreciated by those versed in the art of signal processing, the complex signal $\phi 11$ fed to the complex signal multiplier X for multiplying the baseband/intermediate band data encoded signal of Beam(1) is selected/set at the beam forming channel BF11 such that when the base-band/intermediate-band data encoded signal of Beam(1) being multiplied by the complex signal $\phi 11$ is up-converted to the carrier frequency band (such up-conversion is often performed by the signal mixers (e.g. analog) at the front-end module FRE) the carrier frequency component is phase shifted by a preselected phase shift. The proper phase shift $\phi 11$ (and accordingly the suitable complex multiplier signal ϕ11) are generally set according to the desired direction to transmission of the Beam(1) and the location, within the antenna array, of the respective antenna AE1 that is connected to beamforming channel BF11 for transmitting a properly delayed and complex phase multiplied component of Beam(1). It should be noted that the complex signal ϕ11 fed to complex signal multiplier X for multiplying the intermediate/baseband band digital representation of the beam component of Beam(1), may additionally or alternatively be selected to introduce a desired gain (amplitude adjustment) so as to implement beamforming tapering.

Considering the above, it should be noted that the specific technique for TTD scheme implementation according to the present invention is not limited by the above description and, as would readily be appreciated by those versed in the art, the beamforming channels may be configured and operable for implementing TTD schemes by utilizing other suitable TTD techniques.

In embodiments where TTD is not implemented, introduction of only one of the above described phase shifts and/or time delays may be implemented (e.g. one of (i) or (ii) above).

In view of the above description, it is understood that according to some embodiments of the present invention, the beamforming circuits of the embodiments of FIGS. 2A, 2B, 3, and 4, with the antenna signal ports of the Ant-I/O module may be configured as analog ports capable of converting signals between digital and analog forms in at least one direction, and the cascade ports of the cascade-I/O module may also be analog ports capable of converting signals between digital and analog forms in at least an opposite direction. The bypass channels connecting between the antenna signal ports of the Ant-I/O and the cascade ports of the cascade-I/O, as well as the beam-splitters or beam-combiners used in such connections, and also the one or more beamforming channels of the beamforming circuits, may all be configured and operable as digital modules.

Thus, as is clear from the description above, in various embodiments of the present invention, the beam forming circuit BF-CHIP(1,1) is implemented/configured for operating in reception mode, or in transmission mode. It should be also understood that in some embodiments, the present invention is implemented in a beamforming circuit configured with dual configuration for operation in both transmission and reception modes. The general principles of such configuration are illustrated in FIGS. 2A and 2B, while considering some of the beamforming channels as some antenna ports (or converters between digital to analog associated therewith), and some of the signal splitter/combiners, connecting such elements may be configured for reception mode operation, for example as described with reference to FIG. 3, while others of these elements may be configured for transmission operation, for example as described with reference to FIG. 4.

Reference is now made to FIG. 5 showing, in a block diagram, the configuration of system 10 of the present invention for operation in reception mode according to another embodiment of the present invention. The configuration shown in FIG. 5 is similar to that of FIG. 3 as described above, except that in the embodiment of FIG. 5 the bus(es), e.g. BUS1, is an analog bus, in which the beams' data streams, e.g. Beam(1), are communicated in analog form/representation. In this example, the bus connection Bus-I/O includes an analog to digital converter ADC and a digital to analog converter DAC connected to the bus BUS1. The analog to digital converter ADC of the Bus-I/O is connected to the bus BUS1 and is adapted for extracting beam's data stream Beam(1) from the bus BUS1 (e.g. enabling to extract the data streams of one or more relevant beams from the bus), and converting it to digital from by which it can be processed by the beamforming circuit BF-CHIP(1,1). The combiners, marked Σ in the figure, operate to obtain the received signals, which are received by the antenna elements (e.g. the signals received by AE1 and AE2 associated with the beamforming circuit BF-CHIP(1, 1)) and which are properly delayed/shifted by the beamforming channels BF11 and BF12 according to the direction of Beam(1), and to combine them with the extracted data stream of Beam(1) (e.g. in this way enhancing/improving the beamforming of the beam Beam(1)). Then, the combined/updated data stream of the beam Beam(1) is converted back from digital to analog form by the digital to analog converter DAC of the bus connection and fed back to the bus BUS1. In the similar manner, data streams of other beams are read from the bus, updated/enhanced by the beamforming circuit. and fed back to the bus.

It should be noted that alternatively or additionally, as will readily be appreciated by those versed in the art, in some implementations of the invention, in which the bus is an analog bus, the use/inclusion of ADCs may be obviated from the bus-connection Bus-I/O of a beamforming circuit BF-CHIP(1,1) of the invention configured for reception mode. For instance, instead of using bus-connection Bus-I/O having DACs as described above and combining the signals of the BF-CHIP(1,1) with the beam's data stream Beam(1) in digital from, analog means (e.g. analog signal combiners/multiplexed) may be included and/or used for combining the beam formed signals received by the beamforming circuit BF-CHIP(1,1), after they have been converted to analog by the DAC, with the analog data stream of the respective beam Beam(1), which is communicated through the bus.

Other features and configurations of the system 10 shown in FIG. 5 may be similar to those described with reference to FIG. 3 above, and thus, for clarity, description of these elements and their operation is not repeated here.

Reference is made to FIG. 6 showing, in a block diagram, the configuration of system 10 of the present invention for operation in transmission mode according to another embodiment of the present invention. The configuration shown in FIG. 6 is similar to that of FIG. 4 described above, except that in the embodiment of FIG. 6 the bus(es), e.g. BUS1, is an analog bus in which the beams' data streams, e.g. Beam(1), are communicated in analog form/representation. In this example, the bus connection Bus-I/O includes an analog to digital converter ADC and a digital to analog converter DAC connected to the bus BUS1. The analog to digital converter ADC of the Bus-I/O is connected to the bus BUS1 and is adapted for extracting beam's data stream Beam(1) from the bus BUS1 (e.g. enabling to extract the data streams of one or more relevant beams from the bus), and converting it to digital form by which it can be processed by the beamforming circuit BF-CHIP(1,1). The digital from of the beams' data streams, e g. of Beam(1), is split, and one copy thereof is directed to certain of the beamforming channels, e.g. BF11 and BF12, by which it is properly delayed/shifted for transmission of the beam Beam(1) via the antenna elements AE1 and AE2, and another copy of the data stream of Beam(1) is directed to the digital to analog converter DAC of the Bus-I/O by which it is converted back to analog form, and fed to the bus BUS1.

It should be noted that, alternatively or additionally, as will readily be appreciated by those versed in the art, in some implementations of the invention, in which the bus is an analog bus, the use/inclusion of DACs may be obviated from the bus-connection Bus-I/O of a beamforming circuit BF-CHIP(1,1) of the invention configured for transmission mode. For instance, instead of using bus-connection Bus-I/O having DACs as described above, analog means (e.g. analog signal splitter/demultiplexed) may be included and/or used for splitting/duplicating the data stream of the beam Beam(1) that is communicated through the bus and providing the copy of that datastream to the ADC of the bus-connection Bus-I/O by which it may be processed as described above for transmission of the beam Beam(1) by the antenna elements of the beamforming circuit BF-CHIP(1,1).

Other features and configurations of the system 10 shown in FIG. 6 may be similar to those described with reference to FIG. 4 above, and thus, for clarity, description of these elements and their operation is not repeated here.

The invention claimed is:

1. A beamforming circuit, comprising:
an antenna input/output (I/O) module comprising a plurality of antenna ports for connecting directly or indirectly to a plurality of antenna elements of an antenna system;
a data bus connection for connecting to a data bus for communication of one or more beams' signals indicative of data streams of one or more beams to be produced by the beamforming circuit;
a beamforming module comprising a plurality of beamforming channels connectable in between said data bus connection and said plurality of antenna ports of said antenna I/O module and adapted to process signals communicated between the data bus and the plurality of antenna ports for introducing controllable shifts being at least one of time delay and phase shift to the processed signals so as to beamform said processed signals received or transmitted by respective antenna elements to form at least one beam;
wherein the beamforming circuit comprises a cascade input/output (I/O) module comprising a plurality of cascade ports connected to said plurality of antenna ports respectively via a plurality of corresponding bypass channels, such that each antenna port is connectable, in parallel, to at least one respective bypass channel and to one or more of said beamforming channels via a signal splitter/combiner configured and operable for at least one of:
combining signals of the respective bypass channel and the one or more beamforming channels associated with the respective antenna port to form a combined signal at said respective antenna port; and
splitting the signal of the respective antenna port to form duplicates thereof at said respective bypass channel and the one or more beamforming channels associated with the respective antenna port;
said cascade I/O module thereby enabling connection to said beamforming circuit, of one or more additional beamforming circuits, each one or more additional beamforming circuit comprising a beamforming module, which connection is in a "vertical" cascade, for forming, by one or more beamforming modules of said one or more additional beamforming circuits, one or more additional beams, in addition to said at least one beam.

2. The beam forming circuit of claim 1, wherein said plurality of antenna elements is a subset of the antenna elements of the antenna system, said antenna system comprising a plurality of subsets of antenna elements, and said beamforming circuit is adapted for beamforming signals associated with said subset of antenna elements; and
wherein said data bus connection of said beamforming circuit is configured and operable for connecting the beamforming circuit horizontally to one or more additional beam forming circuits that are associated with additional respective subsets of antenna elements of the antenna array; thereby enabling said beamforming circuit and said one or more additional beamforming circuits connected thereto horizontally, to form said at least one beam utilizing the plurality of subsets of antenna elements of the antenna system.

3. The beamforming circuit of claim 2 wherein said antenna system is a scalable antenna system comprising a plurality of antenna panels each comprising one of said subsets of the antenna elements.

4. The beamforming circuit of claim 3 wherein each antenna panel is associated with one or more beamforming circuits connected in said vertical cascade to the antenna elements of the antenna panel; and wherein each beamforming circuit of said vertical cascade is connected horizontally to at least one other beamforming circuit associated with another antenna panel and located at the same level in the vertical cascade of said another antenna panel.

5. The beamforming circuit of claim 2 configured and operable for enabling connection of said antenna I/O module to antenna panel of a scalable antenna array; and wherein at least one of the following:
the beamforming circuit is configured and operable in transmission mode for transmitting signals through said antenna elements; where the data bus connection is adapted for extracting certain beams' signals of said data bus for provision of the certain beams' signals to corresponding beam-forming channels associated with processing of said certain beams' signals; and
the beamforming circuit is configured and operable in reception mode for receiving signals through said antenna elements; and the data bus connection is adapted for combining the processed signals of the beamforming channels with the corresponding beams' signals communicated through said data bus;
thereby enabling to connect to said beamforming circuit, with the one or more additional beamforming circuits of the "horizontal" connection.

6. The beamforming circuit of claim 5 wherein said data-bus is analog and the data-bus connection comprises one or more convertors between analog and digital; and wherein at least one of the following:
the beam forming circuit is configured and operable in transmission mode; and the one or more convertors between analog and digital comprise at least ADC adapted for extracting the certain beams' signals of the data-bus by converting said certain beams' signals from analog to digital form; and
the beamforming circuit is configured and operable in reception mode; and the one or more convertors between analog and digital comprise at least DAC adapted for converting the processed signals of the beamforming channels to analog form for communication through the data bus.

7. The beamforming circuit of claim 1 wherein said antenna signal ports of the antenna I/O module are analog ports capable of converting signals between digital and analog forms in at least one direction; and said cascade ports of the cascade I/O module are analog ports capable of converting signals between digital and analog forms in at least an opposite direction.

8. The beamforming circuit of claim 7 wherein said bypass channel and said one or more beamforming channels are digital modules.

9. The beamforming circuit of claim 1 configured for connecting to a certain first number of antenna elements, being said plurality of antenna elements, and adapted for forming up to a certain second number of beams; and
   wherein said beam-forming module comprises at least said certain second number of beamforming channels connected to each of said certain first number of antenna elements.

10. The beamforming circuit of claim 1, wherein said beamforming module comprises a pool of said beamforming channels and a controllable connectivity network configured and operable for allocating and connecting one or more beamforming channels of the pool to selected antenna elements of said plurality of antenna elements, for dynamically adjusting complex beamforming operations.

11. The beamforming circuit of claim 1 wherein said antenna I/O module is adapted for connecting directly to said plurality of antenna elements via said plurality of antenna ports, or via an RF front-end module(s) of the plurality of antenna elements; and wherein said antenna I/O module is also adapted for connecting indirectly to said plurality of antenna elements by connecting to a cascade I/O module of another beamforming circuit in said "vertical" cascade, which is in torn connected, directly or indirectly, to said plurality of antenna elements.

12. The beamforming circuit according to claim 1 wherein the beamforming channels are configured and operable for adjusting a gain of the signals processed thereby, and thereby enable enhanced beamforming with reduced side lobes and/or improved beam shaping.

13. An antenna system comprising:
   a plurality of beamforming circuits comprising one or more beamforming circuits configured according to claim 1,
   a plurality of antenna elements arranged in an array, and comprising, a plurality of subsets, each subset including one or more antenna elements of said plurality of antenna elements, and
   a vertical cascade of said plurality of beamforming circuits, for a subset of said plurality of subsets, said vertical cascade connected directly or indirectly to one or more antenna elements of the subset, for at least one of transmitting and receiving signals thereby.

14. The antenna system of claim 13 wherein the vertical cascade of the beamforming circuits is connected indirectly to the one or more antenna elements of the subset, via an RF front-end module of the antenna system, such that an antenna I/O module of a first one of the beamforming circuits of said vertical cascade is connected to said RF front-end module and said RF front-end module is connected to RF feeding ports of the one or more antenna elements of the subset.

15. The antenna system of claim 13 wherein said plurality of antenna elements comprise one or more subsets, each subset being associated with at least one respective vertical cascade of one or more beamforming circuits.

16. The antenna system of claim 15, each subset of said one or more subsets being configured as an antenna panel.

17. The antenna system of claim 13 comprising a plurality of subsets of antenna elements each associated with its respective vertical cascade of beamforming circuits;
   wherein each beamforming circuit of the respective vertical cascade is connected horizontally to at least one other beamforming circuit being a member of a vertical cascade of another one of said subsets of antenna elements; and the antenna system comprises at least one data bus implementing horizontal connection in between beamforming circuits of different vertical cascades.

18. The antenna system of claim 17 wherein each subset of said plurality of subsets of antenna elements with its respective vertical cascade of beamforming circuits is configured as a separate antenna panel.

19. A beamforming circuit, comprising:
   an antenna input/output (I/O) module comprising a plurality of antenna ports for connecting directly or indirectly for obtaining signals received by a plurality of antenna elements of an antenna system;
   a signal splitter/combiner module comprising a plurality of signal splitters connectable to said plurality of antenna ports, wherein each signal splitter is adapted to split signals received by an antenna port connected thereto to form at least two replicas (duplicates);
   a beamforming module comprising a plurality of beamforming channels each being connectable to an antenna port of said plurality of antenna ports via at least one of the signal splitters of said signal splitter/combiner module for receiving a duplicate/replica signal of said antenna port of said plurality of antenna ports, and configured and operable for processing the signals received from said antenna port of said plurality of antenna ports for introducing thereto a controllable shift, being at least one of a time delay and phase shift, to thereby enable beamforming of signals received by said plurality of antenna elements by combining the time and/or phase shifted signal of the antenna element associated with said antenna port of said plurality of antenna ports with time and/or phase shifted signals of other antenna elements;
   a data bus connection connected to said beamforming module and connectable to a data-bus and configured and operable for receiving time and/or phase shifted signals from the beam forming channels of the beamforming module and encoding said time and/or phase shifted signals on the data-bus such that one or more beams' signals indicative of a data stream of at least one beam are communicated through said data-bus; and
   a cascade input/output (I/O) module comprising a plurality of cascade ports associated with corresponding bypass channels which are connected respectively to said plurality of antenna ports via respective signal splitters of said signal splitter/combiner, such that each cascade port obtains the replica of the signals received by the respective antenna port to which it is connected;
   said cascade I/O module thereby enables connection to said beamforming circuit, of one or more additional beamforming circuits, each one or more additional beamforming circuit comprising a beamforming module, which connection is in a "vertical" cascade, for forming, by one or more beamforming modules of said one or more additional beam forming circuits, one or more additional beams, in addition to said at least one beam.

20. A beamforming circuit, comprising:
   a data bus connection connectable to a data-bus and adapted to decode from the data-bus, one or more beams' signals indicative of data streams of one or more beams to be transmitted by antenna elements of an antenna array;
   a beamforming module comprising a plurality of beamforming channels connectable to said data bus connection for receiving said one or more beams' signals of said one or more beams; said beamforming module comprises one or more beamforming channels adapted to receive a beams' signal associated with a data stream of at least one beam of said one or more beams and configured and operable for introducing controllable respective shifts, being at least one of respective time delays and respective phase shifts, to the beams' signal to form one or more time and/or phase shifted signals adapted for forming said beam upon transmission of the one or more time and/or phase shifted signals by antenna elements of an antenna array;

an antenna input/output (I/O) module comprising a plurality of antenna ports for connecting directly or indirectly to one or more antenna elements of an antenna system; and wherein the beamforming circuit comprises a cascade input/output (I/O) module comprising a plurality of cascade ports; and said beamforming circuit comprises a signal splitter/combiner module comprising one or more signal combiners; each signal combiner is connectable from one end thereof to an antenna port of said antenna ports, and from another end thereof to at least one beamforming channel of said beamforming channels and to at least one cascade port of said cascade ports via a bypass channel associated with said cascade port, and wherein said signal combiner is adapted for combining the signals of said at least one beamforming channel and said at least one cascade port for providing the combined signal to the antenna port;

thereby providing that said cascade I/O module enables connection to said beamforming circuit, of one or more additional beamforming circuits, each one or more additional beamforming circuit comprising a beamforming module, which connection is in a "vertical" cascade, for forming, by one or more beam forming modules of said one or more additional beamforming circuits, one or more additional beams, in addition to said at least one beam.

* * * * *